United States Patent
Kukino et al.

(10) Patent No.: US 10,245,644 B2
(45) Date of Patent: Apr. 2, 2019

(54) CUTTING INSERT AND METHOD OF MANUFACTURING THE SAME

(71) Applicant: Sumitomo Electric Industries, Ltd., Osaka-shi (JP)

(72) Inventors: Satoru Kukino, Itami (JP); Kentaro Chihara, Itami (JP); Takashi Harada, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 267 days.

(21) Appl. No.: 15/036,337

(22) PCT Filed: Sep. 11, 2015

(86) PCT No.: PCT/JP2015/075777
§ 371 (c)(1),
(2) Date: May 12, 2016

(87) PCT Pub. No.: WO2016/043127
PCT Pub. Date: Mar. 24, 2016

(65) Prior Publication Data
US 2016/0297010 A1 Oct. 13, 2016

(30) Foreign Application Priority Data

Sep. 16, 2014 (JP) .................................. 2014-187225
Nov. 11, 2014 (JP) .................................. 2014-228677

(51) Int. Cl.
*B23B 27/16* (2006.01)
*B23B 27/22* (2006.01)
(Continued)

(52) U.S. Cl.
CPC .............. *B23B 27/145* (2013.01); *B24B 3/34* (2013.01); *B23B 2200/0447* (2013.01);
(Continued)

(58) Field of Classification Search
CPC ...... B23B 2200/0447; B23B 2200/242; B23B 2200/28; B23B 2200/286;
(Continued)

(56) References Cited

U.S. PATENT DOCUMENTS 3,229,349 A * 1/1966 Leksell .................... B23C 5/207
407/113
3,395,434 A  8/1968 Wirfelt
(Continued)

FOREIGN PATENT DOCUMENTS

EP   1291131 A1   3/2003
JP   61178101 A * 8/1986 ........... B23B 27/145
(Continued)

OTHER PUBLICATIONS

International Search Report in PCT International Application No. PCT/JP2015/075777, dated Nov. 24, 2015.

*Primary Examiner* — Sara Addisu
(74) *Attorney, Agent, or Firm* — Venable LLP; Michael A. Sartori; Laura G. Remus

(57) ABSTRACT

A cutting insert including a surface involved in cutting, for which a cutting tool material of a hard sintered body is used. A radius of a nose R portion is 0.4 mm or greater and 2.4 mm or less, an apex angle α of the nose R portion is 50° or greater and 95° or less, a rake angle β at a position of a bisecting plane of the apex angle of the nose R portion is 1° or greater and 10° or less, a chamfer provided in a cutting edge portion is a negative land with unequal width, and at least on one side of the negative land with respect to a boundary which is an apex of a nose R portion cutting edge, a width of the negative land gradually decreases from the apex of the nose R portion cutting edge to a position at which the nose R portion cutting edge is connected to a linear cutting edge. Let W1 be the width of the negative land at the apex of the nose R portion cutting edge, and W2 be the width (Continued)

of the negative land at both ends of the nose R portion cutting edge, then the W1 is 0.04 mm or greater and 0.2 mm or less, and a ratio of the W1 to the W2 is 1.5 or greater.

8 Claims, 10 Drawing Sheets

(51) Int. Cl.
    *B23B 27/14* (2006.01)
    *B24B 3/34* (2006.01)

(52) U.S. Cl.
    CPC ..... *B23B 2200/242* (2013.01); *B23B 2200/28* (2013.01); *B23B 2200/286* (2013.01); *B23B 2200/3654* (2013.01); *B23B 2222/16* (2013.01); *B23B 2226/125* (2013.01); *B23B 2226/18* (2013.01)

(58) Field of Classification Search
    CPC .......... B23B 2200/3654; B23B 27/145; B23B 2200/201; B23B 27/16
    See application file for complete search history.

(56) References Cited

U.S. PATENT DOCUMENTS

| | | | | |
|---|---|---|---|---|
| 3,792,515 A * | 2/1974 | Lundgren | ............. | B23B 27/143 407/113 |
| 3,866,282 A * | 2/1975 | Lundgren | ............. | B23B 27/143 407/113 |
| 4,044,439 A * | 8/1977 | Romagnolo | .......... | B23B 27/143 407/114 |
| 5,006,020 A * | 4/1991 | Roos | ................. | B23B 27/145 407/113 |
| 5,122,017 A * | 6/1992 | Niebauer | ............. | B23B 27/143 407/114 |
| 5,147,159 A * | 9/1992 | Lowe | ................... | B23B 27/143 407/114 |
| 5,246,315 A * | 9/1993 | Hansson | .................. | B23B 5/12 407/114 |
| 5,593,255 A * | 1/1997 | Satran | .................... | B23C 5/109 407/113 |
| 5,634,745 A * | 6/1997 | Wiman | ................. | B23B 27/141 407/113 |
| 5,771,763 A * | 6/1998 | Naslund | ................ | B23B 27/145 407/113 |
| 5,904,450 A * | 5/1999 | Satran | .................... | B23C 5/202 407/113 |
| 6,595,092 B1 * | 7/2003 | Taniguchi | ............... | B23B 27/06 407/114 |
| 6,623,217 B2 * | 9/2003 | Brockett | ................ | B23B 27/141 407/114 |
| 6,655,881 B2 * | 12/2003 | Shimizu | ................ | B23B 27/145 407/113 |
| 7,118,312 B2 * | 10/2006 | Norstrom | .............. | B23B 27/145 407/113 |
| 7,931,426 B2 * | 4/2011 | Lof | ....................... | B23B 27/145 407/113 |
| 2002/0127068 A1 * | 9/2002 | Kinukawa | ............. | B23B 27/145 407/113 |
| 2006/0188347 A1 * | 8/2006 | Kratz | .................... | B23B 27/145 407/113 |
| 2006/0228179 A1 * | 10/2006 | Alm | ...................... | B23B 27/145 407/113 |
| 2007/0116531 A1 * | 5/2007 | Okita | .................... | B23B 27/143 407/114 |
| 2008/0199263 A1 * | 8/2008 | Jonsson | .................. | B23B 27/10 407/11 |
| 2008/0292415 A1 * | 11/2008 | Kuroda | ................. | B23B 27/145 407/61 |
| 2011/0142555 A1 * | 6/2011 | Yamazaki | ............. | B23B 27/143 407/2 |
| 2012/0198973 A1 * | 8/2012 | Schleinkofer | ......... | B23B 27/143 82/117 |
| 2012/0282048 A1 * | 11/2012 | Kountanya | ........... | B23B 27/145 407/113 |
| 2013/0236258 A1 * | 9/2013 | Nada | ..................... | B23B 27/141 407/114 |
| 2015/0202730 A1 * | 7/2015 | Watanobe | ................ | B24B 3/34 407/115 |
| 2016/0214180 A1 * | 7/2016 | Sasaki | ................... | B23B 27/141 |
| 2016/0339525 A1 * | 11/2016 | Matsuda | ............... | B23B 27/143 |
| 2018/0009040 A1 * | 1/2018 | Sasaki | .................... | B23B 27/22 |

FOREIGN PATENT DOCUMENTS

| | | |
|---|---|---|
| JP | H04-70406 U | 6/1992 |
| JP | 2000-071110 A | 3/2000 |
| JP | 2000-190108 A | 7/2000 |
| JP | 2002-192407 | 7/2002 |
| JP | 2006-187813 A | 7/2006 |
| JP | 2007-007736 A | 1/2007 |
| JP | 2011-045955 A | 3/2011 |
| WO | WO-2014/155890 A1 | 10/2014 |

\* cited by examiner

CUTTING INSERT AND METHOD OF MANUFACTURING THE SAME

TECHNICAL FIELD

The present invention relates to a cutting insert having a cutting edge that is composed of one of cBN based sintered body (sintered body composed mainly of cubic boron nitride), ceramics, and cermet, and particularly to a cutting insert and a manufacturing method for manufacturing the cutting insert industrially in high-volume mass production, the cutting insert exhibiting stable life in cutting of iron group based highly hard difficult-to-cut material and high speed, highly efficient cutting of iron group based metal material, further reducing what is called chatter (vibration) of a tool at the time of cutting and generation of an affected layer to achieve a machined surface with excellent surface texture.

BACKGROUND ART

As a well-known technology for an indexable cutting insert that allows a cutting edge to be renewed by replacement or exchange of a cutting edge corner portion, there is known an insert in which a cutting tool material composed of one of cBN based sintered body, ceramics, and cermet (hereinafter, abbreviated as hard sintered body) is used for a surface involved in cutting (for instance, see PTL 1).

For a super hard cutting tool material composed of a hard sintered body, high precision shaping of raw material powder is difficult. Thus when the surface roughness of a machined surface is considered to be important, a method is adopted to improve a cutting edge geometry to be transferred to a workpiece by performing grinding after a flank face and a rake face are sintered.

Although the mainstream of cutting insert using the hard sintered body is that a small piece of cutting tool material composed of a hard sintered body is bonded to a corner portion of a base metal composed of cemented carbide, cermet or the like in consideration of cost effectiveness, some cutting inserts are composed of a hard sintered body in its entirety.

In a conventional product of cutting insert of this type, the entire rake face is ground in parallel with the insert bottom surface, and subsequently, a lateral face used as a flank face, a nose R portion, and a flank face are formed.

In the cutting insert including a surface involved in cutting, to which a hard sintered body is applied, when an object to be machined (workpiece) is a highly hard difficult-to-cut material such as a heat-resistant alloy or a hardened steel, chipping, fracture of a cutting edge is likely to occur due to inevitable vibration, impact in chip shearing, intermittent cutting, interrupted cutting. As reinforcement measures for a cutting edge, a negative land (chamfer, see also PTL 1) that blunts the cutting edge is provided along a cutting edge ridge line.

Also, depending on cutting application, a cutting insert is used in which the cutting edge ridge line portion has undergone honing treatment.

For cutting inserts for finish machining including a surface involved in cutting, to which a hard sintered body is applied, it is general that a great number of the cutting inserts is mounted on a planar grinder, and all of them are ground by a single grinding wheel so as to finish each cutting insert having the rake face at the same height as (flush with) the upper surface of the insert.

Such cutting inserts are disclosed in, for instance, PTL 2 cited below. Also, those cutting inserts are described in the catalogs disclosed on the Internet by tool manufacturers (for instance, Sumitomo Electric Hardmetal Corporation, Tungaloy Corporation, Mitsubishi Materials Corporation, Sandvik Company, and others).

For the type of insert in which a small piece of hard sintered body is bonded to a corner portion of the base metal, a method may be adopted in which the upper surface and bottom surface of the base metal are first ground, then the small piece of hard sintered body is bonded to the corner portion so that the upper surface of the small piece projects upward from the upper surface of the base metal, and subsequently, only the small piece is ground to form a rake face, and the lateral faces of the base metal and a nose R portion and a flank face to be provided in the small piece are finished.

CITATION LIST

Patent Literature

PTL 1: Japanese Unexamined Patent Application Publication No. 2006-187813
PTL 2: Japanese Unexamined Patent Application Publication No. 2011-045955

SUMMARY OF INVENTION

Technical Problem

The cutting inserts including a surface involved in cutting, to which a hard sintered body (one of cBN, ceramics, and cermet) is applied have the advantage as described below, and thus in recent years, the trend has been to replace grinding machining with cutting machining using this type of cutting insert.

Advantage 1: Although it was difficult to achieve high accuracy machining with high-speed steel or cemented carbide, high accuracy machining of a highly hard difficult-to-cut material such as a heat-resistant alloy or a hardened steel is possible.

Advantage 2: Unlike a grinding wheel, with a single insert, profile finish machining of a product having a complicated geometry, for instance, a turbine disc, a gear, shaft parts, is possible.

For an insert using a hard sintered body, utilized for finish cutting of a difficult-to-cut material, the angle of a negative land formed on a cutting edge is set according to the hardness and constituent elements of the difficult-to-cut material, the geometry of a work to be machined, and required dimensional accuracy.

For instance, when the dimensional accuracy of a work is considered to be more important than the fracture resistance of a cutting edge, the width of the negative land is decreased to reduce cutting force, whereas when the fracture resistance of a cutting edge is desired to be improved, the width of the negative land is increased, and honing treatment is further performed on the cutting edge ridge line depending on cutting application and further reinforced cutting edge is used.

The above-mentioned negative land in a conventional cutting insert is formed by the following method: a rake face is ground in parallel with the insert bottom surface, then the outer periphery is machined by grinding to form an insert lateral face, a nose R portion, and a flank face.

Subsequently, a grinding face of a grinding wheel in rotation, inclined by a specific angle around the axis, as the support shaft, perpendicular to the insert bottom surface (or the rake face) is brought into contact with a cutting edge ridge line portion, and the grinding wheel is translated along the nose R portion while being rotated.

Therefore, the formed negative land is parallel with the cutting edge ridge line and has an uniform width, and intersection angles of longitudinal portions with respect to the rake face are uniform.

In the previously-mentioned finish machining of a turbine disc, a gear, shaft parts and the like, there is a need of enabling machining at positions, for instance, as illustrated in FIG. 22 and FIG. 23 by a single cutting insert.

Machining positions of work W (workpiece) of FIG. 22 mixedly includes a low rigidity portion 21 in which vibration or chatter is likely to occur during cutting due to a low thickness, and a high rigidity portion 22 with a high thickness in which highly efficient cutting with high speed feed is required.

Also, machining positions of work W of FIG. 23 has a fitting part 23 which needs exacting external dimensional accuracy, and a necking portion (a relief portion at an intersection position of fitting outside diameter and the end face of a flange or the like) 24 where a high load is applied to a cutting tool, and an oil hole 25 where cutting mode becomes interrupted cutting are present.

For the cutting of the low rigidity portion 21 of FIG. 22 and the fitting part 23 of FIG. 23, a cutting edge geometry having a rake face with a positive rake angle given and decreased width of the negative land is effective because reduction of the thrust force component of cutting resistance is achieved.

On the other hand, in highly efficient cutting performed at the high rigidity portion 22 of FIG. 22 or cutting where the necking portion 24 or the oil hole 25 of FIG. 23 is installed, chipping or fracture of the cutting edge is likely to occur due to the feed force component of cutting resistance or an impact force, and thus a cutting edge geometry having an increased width of the negative land is effective.

However, with a conventional negative land for cutting edge reinforcement, having a constant width and in parallel with the cutting edge ridge line, only one of a request for decreasing the width of the negative land and a request for increasing the width can be met.

Therefore, a troublesome machining method of selectively use one of a plurality of cutting inserts having different geometries has to be adopted. Also, in the case where unallowable machining level difference occurs in a work due to replacement of an insert, selective use of the plurality of cutting inserts cannot be adopted, and so high cost grinding machining such as using a formed grinding wheel has to be adopted under the present situation.

Thus, it is an object of the present invention to provide a cutting insert including a part involved in cutting, to which a hard sintered body is applied, the cutting insert exhibiting stable life in cutting of iron group based difficult-to-cut material, reducing what is called chatter (vibration) of a tool at the time of cutting and also generation of an affected layer, achieving a machined surface with excellent surface texture, and to be able to manufacture the cutting insert in high-volume mass production by devising a method for blank grinding while ensuring excellent quality.

Solution to Problem

A cutting insert according to an embodiment of the present invention includes a surface involved in cutting, for which a cutting tool material composed of one of cBN based sintered body, ceramics, and cermet is used, the cutting insert comprising: a flank face; a nose R portion; a rake face having a positive rake angle; and a negative land with unequal width (chamfer with a negative angle of inclination) disposed between the rake face and the flank face, wherein a radius of the nose R portion is 0.4 mm or greater and 2.4 mm or less, an apex angle α of the nose R portion is 30° or greater and 95° or less, a rake angle β at a position of a bisecting plane of the apex angle of the nose R portion is 1° or greater and 10° or less, a ridge line where the negative land with unequal width and the rake face intersect, and a ridge line where the negative land with unequal width and the flank face intersect are not parallel in plan view, and at least on one side of the negative land with respect to a boundary which is an apex (the position at which the nose R portion cutting edge and the bisector of the apex angle intersect in plan view) of a nose R portion cutting edge, a width of the negative land with unequal width gradually decreases from the apex of the nose R portion cutting edge to a position at which the nose R portion cutting edge is connected to a linear cutting edge, and let W1 be the width of the negative land with unequal width in plan view at the apex of the nose R portion cutting edge, and W2 be the width of the negative land with unequal width in plan view at the position at which the nose R portion cutting edge is connected to the linear cutting edge, then the W1 is 0.04 mm or greater and 0.2 mm or less, and a ratio of the W1 to the W2 is 1.5 or greater.

The apex angle of the nose R portion mentioned herein is equal to the angle between two sides including the nose R in plan view on the side, involved in cutting, of the cutting insert.

The width W1 of the above-described negative land is the width along the bisector of the apex angle of the nose R portion, and the width W2 of the negative land at both ends of the nose R portion cutting edge is the width of the negative land with unequal width in the normal direction through the points Q1, Q2 of joint between a ridge line 8a where the negative land of the nose R portion and the flank face intersect, and a ridge line 8b where a linear negative land and the flank face intersect.

A method of manufacturing a cutting insert according to an embodiment of the present invention includes: clamping and holding a material before grinding (only includes a cutting tool material composed of one of cBN based sintered body, ceramics, and cermet, or cemented carbide with a cutting tool material brazed thereto, hereinafter abbreviated as a blank material) by a chuck of a grinder in a thickness direction, the material before grinding including a surface involved in cutting, for which a cutting tool material composed of one of cBN based sintered body, ceramics, and cermet is used, the chuck having controllable position and posture; pressing the cutting tool material against an end face of a grinding wheel in rotation of the grinder in this state; grinding the cutting tool material which is substantially treated as an object to be ground; and forming the flank face, the negative land with unequal width, and the rake face, wherein the grinding of the rake face is performed with a grinding surface of the grinding wheel inclined with respect to an upper surface of the cutting tool material in a direction in which a positive rake angle is given, and the above steps are performed by changing the posture and position of the chuck without releasing the holding of the blank material by the chuck.

Advantageous Effects of Invention

The cutting insert of this invention provides excellent fracture resistance and exhibits stable life in cutting of iron group based highly hard difficult-to-cut materials or high speed, highly efficient cutting of iron group based metal materials. In addition, what is called chatter of a tool at the time of cutting and generation of an affected layer are also reduced, and a machined surface with excellent surface texture is obtained.

According to the manufacturing method of this invention, it is possible to manufacture cutting inserts in high-volume mass production using a grinder having an automatic machining function while ensuring excellent quality, the cutting inserts each including a part involved in cutting, to which a hard sintered body is applied.

DESCRIPTION OF EMBODIMENTS

[Description of Embodiments of Present Invention]

Figure 1:
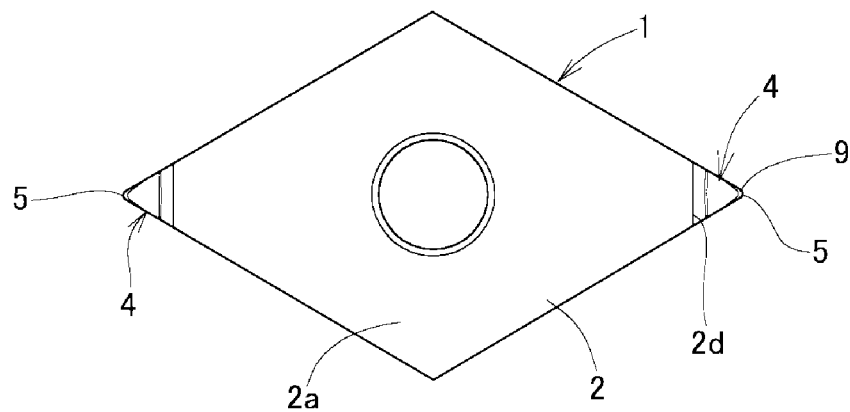
FIG. 1 is a plan view illustrating an example of a cutting insert according to an embodiment of the present invention.
Figure 2:
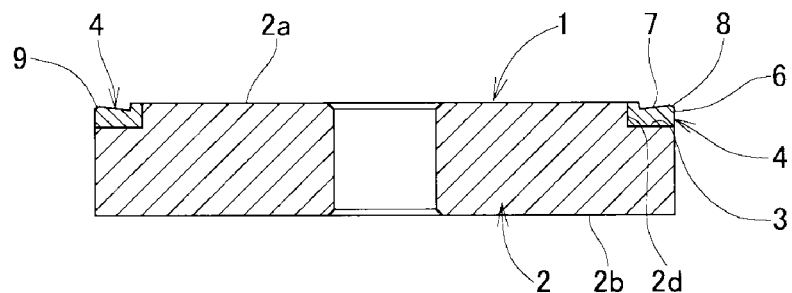
FIG. 2 is a sectional view taken along a diagonal line through an acute angle corner of the cutting insert of FIG. 1.

A cutting insert according to an embodiment of the present invention is a cutting insert including a surface involved in cutting, for which a cutting tool material composed of one of cBN based sintered body, ceramics, and cermet having superior wear resistance, toughness is used, the cutting insert including a flank face, a nose R portion, a rake face having a positive rake angle, a cutting edge formed by an intersecting ridge between the rake face and a flank face, and a negative land with unequal width along the cutting edge.

For the cBN based sintered body, a known sintered body containing 10% to 99.9% volume ratio of cBN (cubic crystal boron nitride) may be used.

This cutting insert is such that the radius of the nose R portion is set to 0.4 mm or greater and 2.4 mm or less, and the apex angle α of the nose R portion is set to 30° or greater and 95° or less. Also, rake angle β at a position of the bisecting plane of the apex angle of the nose R portion is set to 1° or greater and 10° or less.

The radius of the nose R portion is specified in the ISO standard. The specification value is defined from 0.4 mm to 2.4 mm in increments of 0.2 mm. Particularly, one of 0.8 mm, 1.2 mm, and 1.6 mm is preferable because of better balance between cutting resistance and cutting edge strength.

The apex angle α of the nose R portion is also a numerical value specified in the ISO standard, and one of 35°, 55°, 60°, 80°, and 90° among the specification values is preferable because of better balance between cutting resistance and cutting edge strength.

The rake angle β of 1° or less and 10° or greater at a position of the bisecting plane of the apex angle of the nose R portion is not preferable. A preferable range of the rake angle β is 1° to 7°, and a more preferable range is 1° to 3°. Setting the rake angle in this range enables achievement of both the effect of reducing chatter and the effect of improving fracture resistance of the cutting edge.

The negative land is a chamfer in which a ridge line where the negative land intersects with the rake face and a ridge line where the negative land intersects with the flank face are not parallel in plan view. Also, on one side of at least the nose R portion cutting edge of the negative land, with respect to a boundary indicated by the apex of the ridge line where the negative land intersects with the flank face, the width of the negative land gradually decreases from the apex of the nose R portion cutting edge to the position at which the nose R portion cutting edge is connected to a linear cutting edge. Let W1 be the width of the negative land at the apex of the nose R portion cutting edge in plan view, and let W2 be the width of the negative land at both ends of the nose R portion cutting edge in plan view. The negative land has an unequal width such that W1 is 0.04 mm or greater and 0.2 mm or less, and the ratio of W1 to W2 is 1.5 or greater and 400 or less, preferably 2 or greater and 200 or less, and more preferably, 2 or greater and 60 or less.

Figure 24:
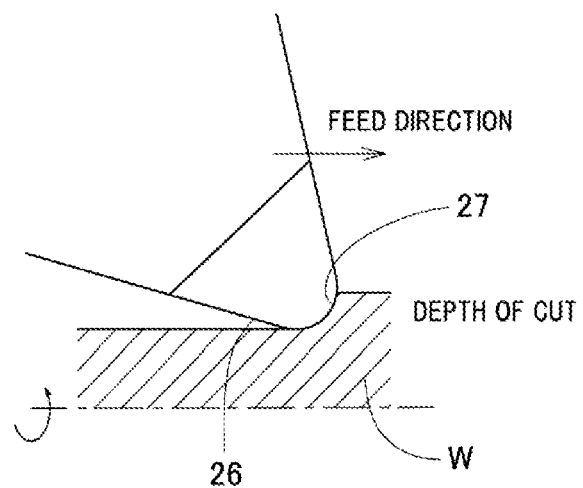
FIG. 24 is a schematic view illustrating a positional relationship between an end cutting edge portion, a side cutting edge portion, and a work.

For instance, in turning, when greater thrust force component of cutting resistance is applied to the end cutting edge portion 26 (see FIG. 24) of the cutting insert, chatter and/or an affected layer are likely to be generated, and the chatter and/or affected layer have an effect on the texture of a machined surface.

Also, feed force component of the cutting resistance is strongly applied to the side cutting edge portion 27 (see FIG. 24 also), and high feed force component causes chipping or fracture to occur on the side cutting edge.

The width of the negative land is made narrower on the end cutting edge portion side, and is made wider on the side cutting edge portion side, thereby enabling to reduce the thrust force component applied to the end cutting edge portion and to reinforce the side cutting edge portion at the same time.

Thus, chatter of the cutting tool during machining and generation of an affected layer are reduced, and the texture and accuracy of machined surface are improved, and furthermore, chipping and fracture of the side cutting edge are reduced, thereby increasing the life of the cutting insert. The chipping and fracture of the side cutting edge are also avoided by reducing vibration of the cutting tool.

In order to reduce generation of chatter due to increase in the cutting resistance while improving the strength of the tip of the side cutting edge in which fracture is likely to occur due to high load caused by the feed force component, the width W1 of the negative land at the apex of the nose R portion cutting edge was set to 0.04 mm or greater and 0.2 mm or less.

In addition, in order to reduce vibration due to increase in the cutting resistance and an affected layer and to prevent chatter, the width W2 of the negative land was set to 0.15 mm or less so that the thrust force component is reduced to low.

Also, in order to exert improvement in fracture resistance of the side cutting edge against the feed force component, reduction of vibration, an affected layer due to reduced thrust force component in the end cutting edge, and chatter prevention effect in a balanced manner, W1 as the ratio with respect to W2 which is set to 1 is 1.5 or greater, preferably 2 or greater and 200 or less.

Such a cutting insert may have a coating layer composed of a carbide, a nitride, a boride, or an oxide of Ti, Al, Si, Cr, and Zr. This is because further improvement in adhesion resistance or wear resistance can be expected.

Next, a method of manufacturing a cutting insert according to an embodiment of the present invention will be described. The manufacturing method includes: clamping and holding a blank material by a chuck of a grinder in a thickness direction, the blank material including a surface involved in cutting, for which a cutting tool material composed of one of cBN based sintered body, ceramics, and cermet is used, the chuck having controllable position and posture; pressing the cutting tool material against an end face of a grinding wheel in rotation of the grinder in this state; grinding the cutting tool material; and forming the flank face, the negative land with unequal width, and the rake face. The grinding of the rake face is performed on the cutting tool material which is substantially treated as an object to be ground, and a grinding surface of the grinding wheel is inclined with respect to an upper surface of the cutting tool material in a direction in which a positive rake angle is given, and the steps are performed by changing the posture and position of the chuck without releasing the holding of the blank material by the chuck. The grinding of the rake face is preferably performed after the flank face and the negative land are created by machining.

The wording "cutting tool material which is substantially treated as an object to be ground" has been used in the sense that when a grinding area of the rake face is sufficiently small so that adverse effect of simultaneous cutting is not observed and flatness is easily achieved, the grinding area may cover part of the base metal, and in such a situation, part of the base metal to be ground is not considered to be a grinding area.

By this manufacturing method, grinding of the flank face, the negative land, and the rake face is performed without releasing and holding the blank material, and thus displacement of a grinding position due to the releasing and holding of the blank material does not occur. Also, grinding of the rake face is performed last so that substantial grinding is performed on the cutting tool material, and thus what is called edge dullness (distortion or loss of shape) of a machined surface also does not occur when the base metal is cut simultaneously.

Therefore, it is possible to efficiently and precisely form an ideal cutting edge shape, in which the thrust force component and feed force component of cutting resistance are reduced.

[Details of Embodiments of Present Invention]

A specific example of a cutting insert according to an embodiment of the present invention will be described below with reference to the drawings. The present invention is defined by the appended claims rather than by these embodiments. All modifications that fall within the scope of the claims and the equivalents thereof are intended to be embraced by the claims.

The cutting insert 1 illustrated in FIG. 1 to FIG. 7 is formed by bonding a small piece of cutting tool material 4 to an acute angle corner portion of base metal 2 which is rhombus shaped in plan view.

Although this invention is applicable to a polygonal cutting insert other than a rhombus cutting insert, only a rhombus cutting insert is illustrated herein because devices related to the cutting edge shape are in common. In order to facilitate the understanding of the cutting edge shape, the cutting edge is illustrated with enlarged radius of the nose R portion in FIG. 4 to FIG. 6.

The base metal 2 is composed of hard metal, cermet or the like. A seat 3, in which part of the upper surface is partially depressed, is formed at an acute angle corner portion of the base metal 2, and the cutting tool material 4 having nose R portion 5 is bonded to the seat 3 for instance by brazing.

The cutting tool material 4 is composed of one of cBN based sintered body, ceramics, and cermet, the one containing 10% to 99.9% volume ratio of cBN (cubic crystal boron nitride).

The cutting tool material 4 has a flank face 6 that has undergone grinding, a rake face 7 that has undergone grinding similarly, a cutting edge 8 formed of a ridge line at the position where the flank face 6 and the rake face 7 intersect, and a negative land 9 with unequal width formed along the cutting edge.

The cutting edge 8 consists of a curved cutting edge ridge line 8a at the nose R portion, and linear cutting edge ridge lines 8b connected to both ends of nose R portion cutting edge.

Figure 4:
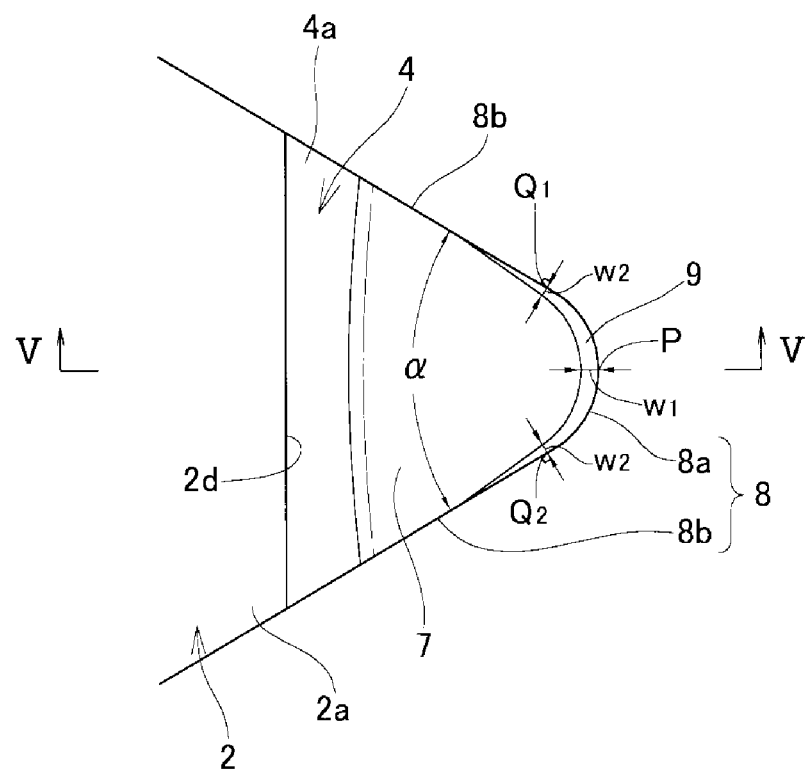
FIG. 4 is an enlarged plan view exaggeratedly illustrating the nose R portion of the cutting insert of FIG. 1.

The negative land 9 has undergone grinding similarly to the flank face 6, and as illustrated in FIG. 4, the width in plan view has a maximum at the apex P of the nose R portion cutting edge 8a, and the width gradually decreases from the apex P to a first point Q1 and a second point Q2 of FIG. 4.

The first point Q1 and second point Q2 are points that indicate the positions of joint between the cutting edge ridge line 8*a* of the nose R portion of the negative land with unequal width, and the linear cutting edge ridge line 8*b* along the cutting edge ridge line 8*a* of the nose R portion. The cutting edge ridge line 8*a* has a R shape having a bending radius of 2.4 mm or less in plan view. Also, each cutting edge ridge line 8*b* is a cutting edge that is a line in plan view.

A line mentioned herein does not refer to only a linear cutting edge in a strict sense. When a curve has a large bending radius exceeding 10 times (24 mm) a maximum bending radius (2.4 mm) of the cutting edge ridge line 8*a* of the nose R portion, an edge in such a shape is considered to be a line because as the end cutting edge, the cutting edge ridge line 8*b* has the same function as that of a linear edge that achieves a proper surface roughness.

The width W1 of the negative land 9 through the apex P in the normal direction at the apex P of the cutting edge ridge line 8*a* of the nose R portion in plan view is set to 0.04 mm or greater and 0.2 mm or less.

Also, the width W2 of the negative land 9 at both ends of the nose R portion cutting edge, in other words, at the first point Q1 or the second point Q2, the width W2 in the normal direction from each point in plan view is set to 0.0005 mm or greater and 0.15 mm or less. Furthermore, the ratio of W1 to W2 is set to 1.5 or greater and 400 or less, preferably 2 or greater and 200 or less, and more preferably, 2 or greater and 60 or less.

Figure 3:
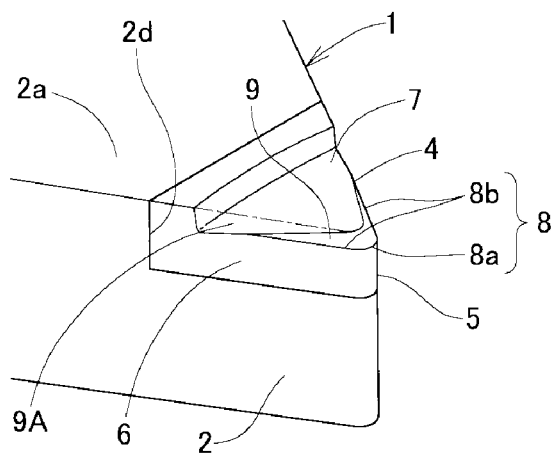
FIG. 3 is an enlarged perspective view of nose R portion of the cutting insert of FIG. 1.

The illustrated negative land 9 with unequal width is created by a method in which the flank face 6 is created by machining, then a supplementary negative land 9A (a negative land including the area indicated by the chain line of FIG. 3) having a large, constant width is formed, and subsequently, the flat upper surface of the cutting tool material 4 is ground, and the rake face 7 having a positive rake angle is formed.

When the rake face 7 having a positive rake angle is formed, part of the supplementary negative land is simultaneously removed, and the amount of removal in this process increases on the linear cutting edge 8*b* side. Therefore, the supplementary negative land with a constant width changes to the illustrated negative land 9 with unequal width.

In the cutting insert of the present invention, the rake angle β at the position of the bisecting plane of the apex angle of the nose R portion 5 is set to 1° or greater and 10° or less. The rake angle β is preferably in a range of 1° to 7°, and in the cutting insert illustrated, a more preferable range of 1° to 3° is selected.

Figure 21:
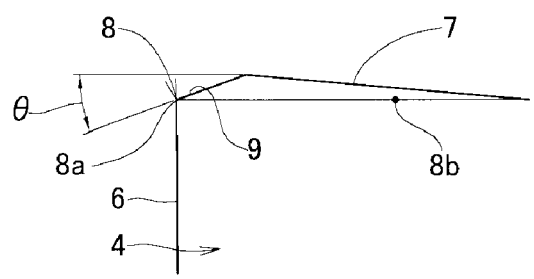
FIG. 21 is an enlarged side view illustrating a negative land of a cutting edge portion.
Figure 22:
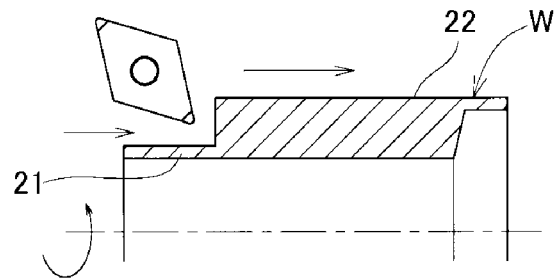
FIG. 22 is an explanatory sectional view illustrating an example of a machined part in turning.
Figure 23:
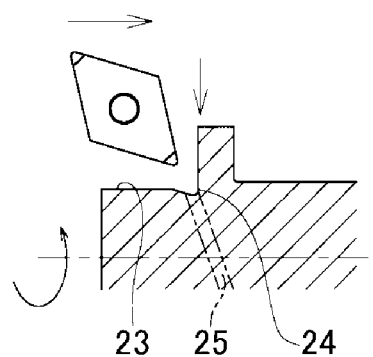
FIG. 23 is an explanatory sectional view illustrating another example of a machined part in turning.

Also, the inclination angle θ of the negative land 9 illustrated in FIG. 21 is a negative land angle on a vertical section to the cutting edge ridge lines 8*a*, 8*b*, and is set to on the order of 10° to 45°.

Figure 25:
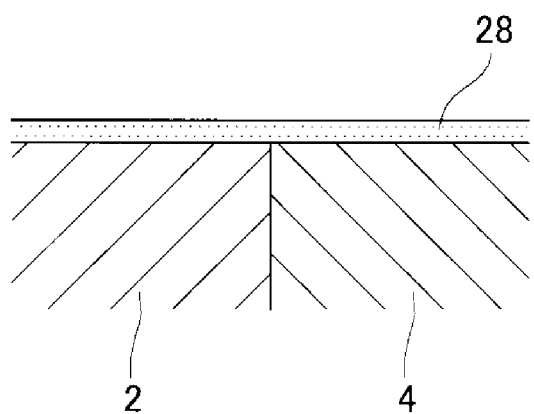
FIG. 25 is a sectional view of a coating layer included in the cutting insert according to the embodiment of the present invention.

The cutting insert according to an embodiment of the present invention may have a coating layer 28 as illustrated in FIG. 25. The coating layer 28 is preferably composed of a carbide, a nitride, a boride, or an oxide of Ti, Al, Si, Cr, and Zr because of superior adhesion resistance or wear resistance.

The cutting insert with such a coating layer may be entirely composed of the same cutting tool material.

Next, a specific example of a manufacturing method according to an embodiment of this invention will be described. First, an example of blank material which is finished by grinding is illustrated in FIG. 12, FIG. 13.

Figure 12:
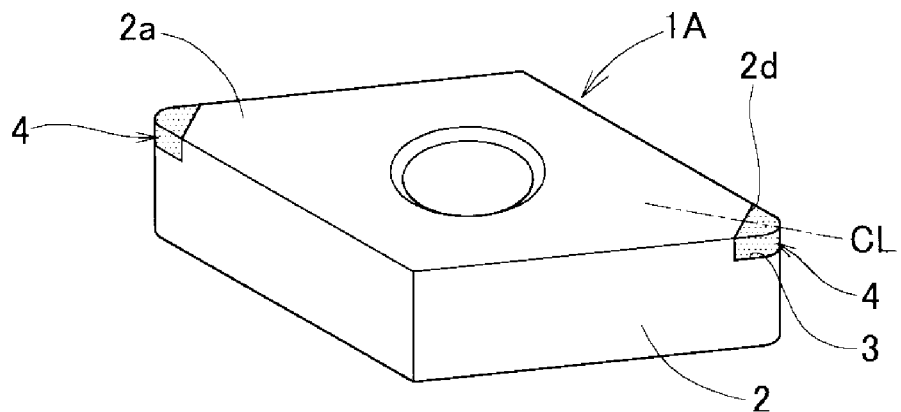
FIG. 12 is a perspective view illustrating an example of blank material of the cutting insert according to the embodiment of the present invention.

A blank material 1A of FIG. 12 is for a rhombus cutting insert in which the previously described small piece of the cutting tool material 4 is bonded to the seat 3 at an acute angle corner portion of the upper surface 2*a* of the base metal 2 which is composed of cemented carbide or ceramics.

Figure 13:
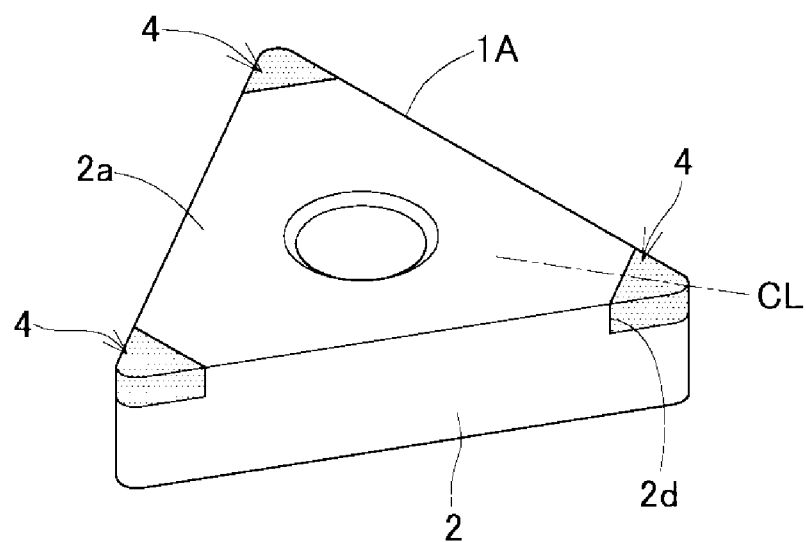
FIG. 13 is a perspective view illustrating another example of blank material of the cutting insert according to the embodiment of the present invention.

A blank material 1A of FIG. 13 is for a triangle cutting insert in which the previously described small piece of the cutting tool material 4 is bonded to the seat 3 at an acute angle corner portion of the upper surface 2*a* of the base metal 2 which is composed of cemented carbide or ceramics.

The cutting insert manufactured by grinding these blank materials is considered to be such that only one corner portion is provided with a small piece of the cutting tool material 4.

In addition, the manufacturing method of the present invention is applicable to a cutting insert having a different shape from the illustrated, for instance, a rhombus cutting insert with a different corner angle, a polygonal cutting insert with 4 or more corners, a negative type cutting insert in which a cutting tool material is bonded to corner portions of the upper and lower surfaces of the base metal, and a cutting insert in which the base metal and the cutting tool material are the same material and are integrally formed.

The base metal 2 has a bonding surface 2*d* which is perpendicular to bisector CL of the cutting-edge side corner portion, and is designed to receive a cutting thrust partial pressure by the bonding surface 2*d*.

Since finish grinding performed on the blank material 1A is independent of the shape of cutting insert and is in common, the following description is given by taking the finish grinding of the blank material 1A (for a rhombus cutting insert) illustrated in FIG. 12 as an example.

Figure 14:
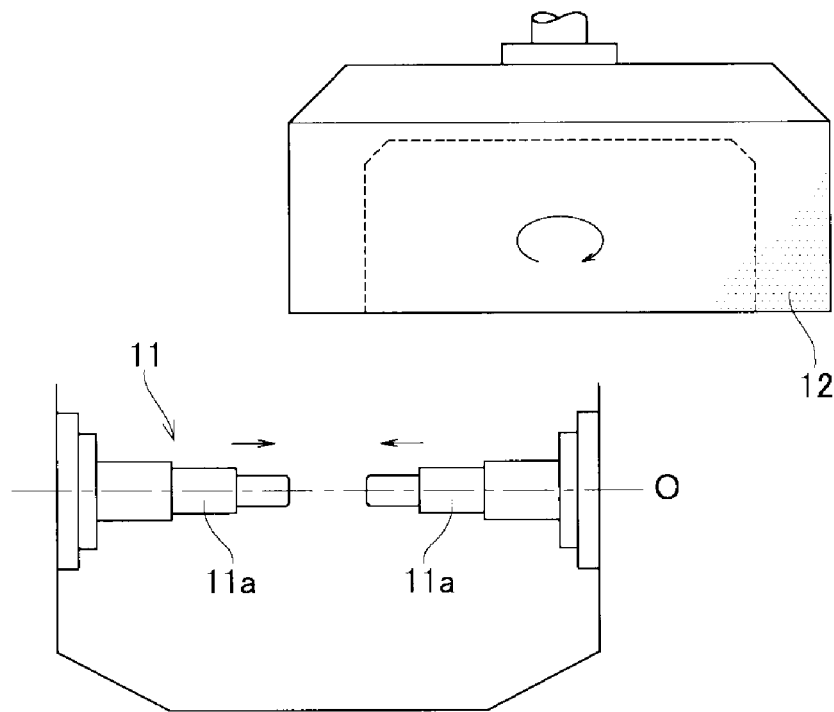
FIG. 14 is a plan view illustrating the principal portion of an example of a grinder which is utilized for practicing a manufacturing method of this invention.

In this invention, grinding is performed using a grinder having a chuck having controllable position and posture. For instance, NC grinder has a chuck 11 as illustrated in FIG. 14, which has numerically controllable position and posture, and a grinding wheel 12 that rotates at a fixed position.

Carry-in and carry-out of the blank material 1A to the grinder, and hand-over of the blank material 1A to the chuck 11 is performed using a robot hand (not illustrated) for which position control is performed.

Although the illustrated grinding wheel 12 is a cup grinding wheel, grinding by a disc-shaped grinding wheel is also possible. For the grinding wheel 12, a fine-grained grinding wheel with No. 600 or greater is suitable.

Figure 15:
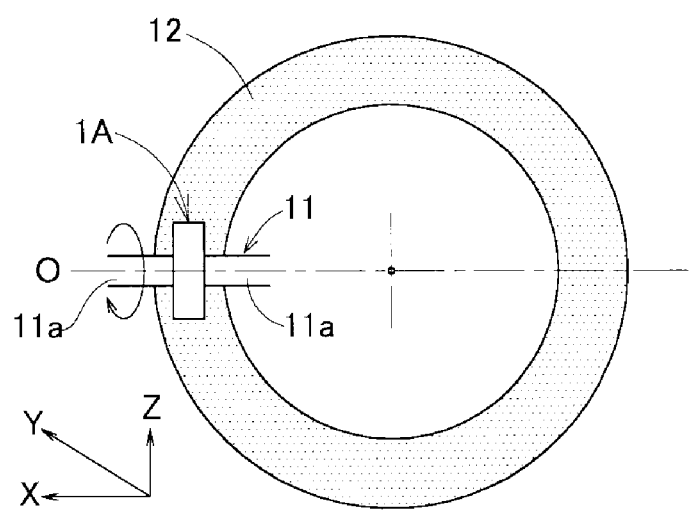
FIG. 15 is a front view illustrating a motion of a chuck of the grinder.
Figure 16:
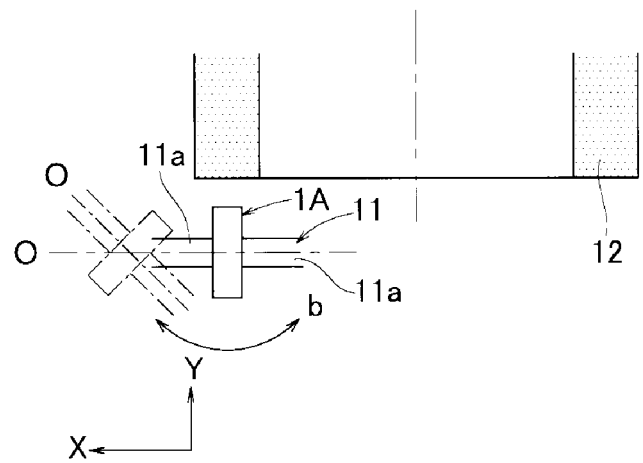
FIG. 16 is a plan view illustrating a motion of the chuck of the grinder.

The grinder used for evaluation of the method of this invention has 4-axis control illustrated in FIG. 15, FIG. 16, that is, each function (no movability in the Z-axis direction) of movement of the chuck in the X-axis, Y-axis directions, rotation around the axis O of the chuck 11, and rotation in b-axis direction of FIG. 15. Grinding according to the manufacturing method of this invention could be conducted using the grinder having the 4-axis control function without any problem.

The chuck 11 has a pair of facing plug gauges 11*a*, 11*a* that allow size change. The blank material 1A, which has been carried-in a normal position, is clamped by a robot hand in a thickness direction of the base metal 2 of the blank material, using plug gauges compatible with the model number of a cutting insert to be machined, and is held with the upper surface and the bottom surface as the position reference.

By controlling the position and posture of the chuck 11, the cutting tool material 4 bonded to a corner portion of the base metal 2 is pressed against the end face of the grinding wheel 12 in rotation, and the previously-described nose R portion 5, flank face 6, negative land 9, and rake face 7 are provided in the cutting tool material 4 by grinding.

Grinding of the rake face 7 in this process is preferably performed after the flank face 6 and the supplementary negative land are created by machining. In addition, it is further preferable that the cutting tool material 4 be treated as substantially an object to be ground.

The supplementary negative land is a land such that the width thereof is constant and greater than or equal to a maximum width of the negative land 9 to be created. The supplementary negative land is formed in advance along the cutting edge 8 which is formed of a ridge line at the position where the flank face 6 and the rake face 7 intersect.

As in FIG. 15, grinding of the flank face 6 may be performed by the following method: the outer peripheral portion, where the flank face of the blank material 1A held by the chuck 11 is to be formed, is pressed against the end face of the grinding wheel 12, and in this state, the chuck 11 is rotated around the axis O.

Subsequently, as illustrated by the chain line of FIG. 16, the axis O of the chuck 11 is inclined with respect to the rotational axis of the grinding wheel, and in this state, a ridge line portion where the upper surface and a lateral face of the cutting tool material 4 intersect is brought into contact with the end face of the grinding wheel 12, and the chuck 11 is moved along the ridge line portion. This operation allows the supplementary negative land to be formed.

Subsequently, the chuck 11 keeps holding the blank material 1A, and the rake face 7 is ground while changing the posture of the chuck.

Grinding of the rake face 7 is performed with the end face of the grinding wheel 12 inclined in a direction in which a positive rake angle is given (in a direction in which the amount of cut on the side away from the corner of the cutting tool material 4 increases) and pressed against the flat upper surface 4a of the cutting tool material 4. In this manner, part of the supplementary negative land along with the surface layer of the upper surface 4a is removed simultaneously with the grinding of the rake face 7, and the amount of removal in this process increases on the linear cutting edge ridge line 8b side, and the supplementary negative land with a constant width thereby changes to the negative land 9 with unequal width.

The above steps are performed without releasing the hold of the blank material 1A with the chuck by changing the posture and position of the chuck 11.

Figure 8:
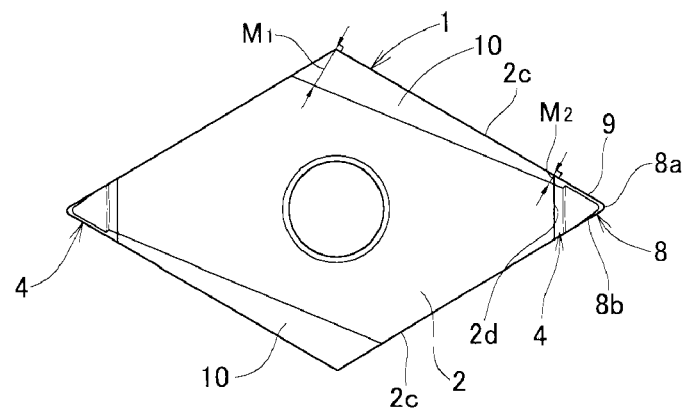
FIG. 8 is a plan view illustrating another example of the cutting insert according to the embodiment of the present invention.
Figure 9:
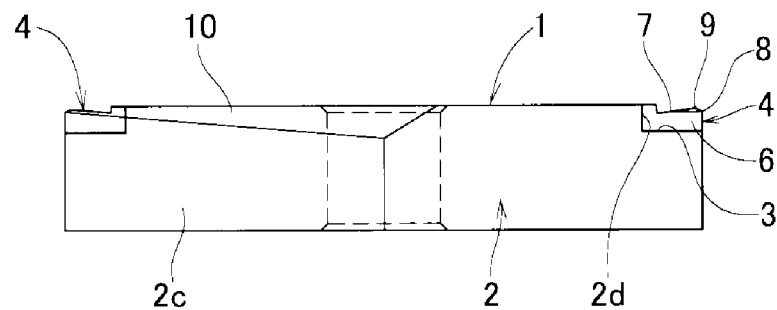
FIG. 9 is a side view of the cutting insert of FIG. 8.
Figure 10:
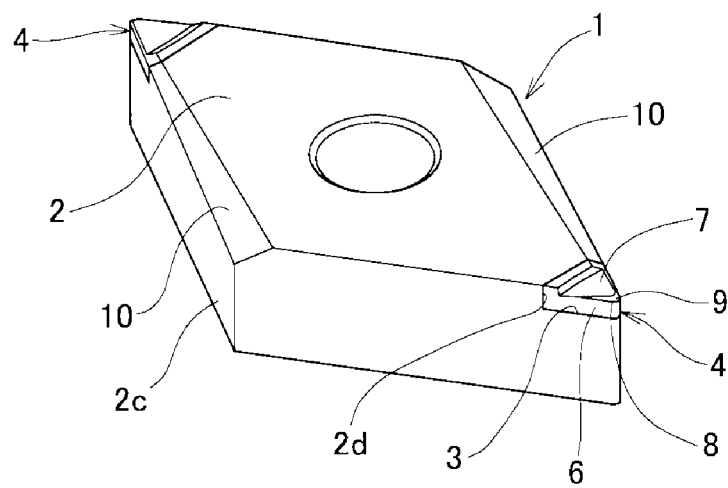
FIG. 10 is a perspective view of the cutting insert of FIG. 8.

On one side (the side used as the end cutting edge) of the negative land 9 with respect to a boundary indicated the apex P (see FIG. 4) of the cutting edge ridge line 8a of the nose R portion, the width gradually decreases from the apex P of the nose R portion cutting edge to the linear cutting edge ridge line 8b side, whereas on the other side with respect to the apex of the nose R portion cutting edge, the width can be wide in the entire area (see FIG. 8 to FIG. 10).

Depending on application of machining, it is desirable that the entire area of the side that is used as the side cutting edge be uniformly reinforced. The cutting edge shape described here meets the desire.

Figure 11:
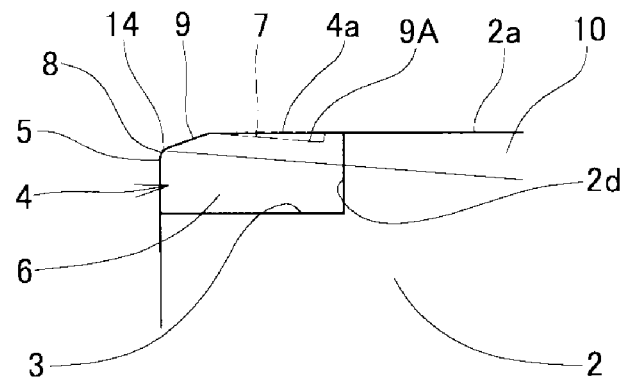
FIG. 11 is a side view illustrating another example of a supplementary negative land formed in a cutting edge ridge line portion on the side of side cutting edge of a cutting tool material.

In this cutting edge shape, as illustrated in FIG. 11, on the side that is used as the side cutting edge, the supplementary negative land 9A is formed in a shape such that the width gradually increases on the linear cutting edge side rather than the nose R portion side.

Figure 18:
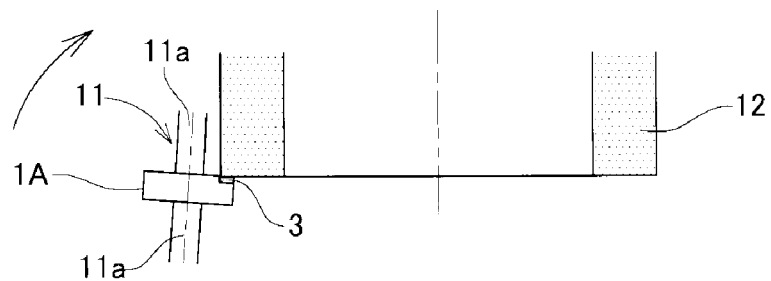
FIG. 18 is a view illustrating a grinding state of a rake face.

As illustrated in FIG. 18, the axis O of the chuck 11 is inclined, and in this state, a portion where the supplementary negative land 9A is to be formed is brought into contact with the end face of the grinding wheel 12, and the point of contact is moved in the longitudinal direction of the cutting edge by moving the chuck 11, thereby making it possible to provide a supplementary negative land.

For a cutting insert which includes the base metal 2 and is provided with a supplementary negative land on the side of the side cutting edge, and in which a small piece of the cutting tool material 4 is bonded to the base metal so that the upper surface of the base metal is flush with the upper surface of the cutting tool material, the supplementary negative land having a width that gradually increases on the linear cutting edge side, it is better to form a chamfer portion 10 with unequal width in the base metal 2 also as illustrated in FIG. 8 to FIG. 10, the chamfer portion 10 being connected to the supplementary negative land on the side used as the side cutting edge, having a width that gradually increases as being away from the cutting edge corner portion.

By the method, part (the area along the linear cutting edge) of the supplementary negative land on the side used as the side cutting edge formed in the cutting tool material 4, and the chamfer portion 10 formed in the base metal 2 may be provided by simultaneous cutting. Because the base metal 2 is superior to the cutting tool material 4 in grinding performance, grinding cost is not affected.

In the chamfer portion 10 at this point, let M1 be the chamfer width in the normal direction to the lateral face 2c in plan view at the end of the lateral face 2c of the base metal 2 on the opposite side to the corner portion involved in cutting (see FIG. 8), and let M2 be the chamfer width in the normal direction to the lateral face of the base metal in plan view at the end of the corner portion involved in cutting (see FIG. 8 also). It is sufficient that the ratio of M1 to M2 be set to 1.2 or greater and 100 or less.

With this condition satisfied, when a rake face with the rake angle $\beta$ of 1° or greater and 10° or less is formed, part of the supplementary negative land on the side used as the side cutting edge is removed, and the negative land 9 is formed having a width which is constant in the entire area or wide and gradually increases toward the first point connected to the linear cutting edge.

"Constant" mentioned herein does not strictly mean constant because the width may not be precisely constant depending on the size of the supplementary negative land or the setting value of the rake angle $\beta$.

The blank material 1A held by the chuck 11 is pressed against the end face of the grinding wheel 12 in rotation, and the supplementary negative land (the negative land with gradually increased width on the side away from the nose R portion) at the ridge line portion of the side to be the side cutting edge of the cutting tool material 4, and the chamfer portion 10 of the ridge line portion of the base metal 2, connected to the supplementary negative land are simultaneously machined.

Subsequently, the posture of the chuck 11 is changed, the end face of the grinding wheel 12 is pressed against the upper surface 4a of the cutting tool material 4 without releasing and holding the blank material 1A, and the rake face 7 with a positive rake angle is formed in the cutting tool material 4. Thus, a negative land can be formed in a shape such that the width is ensured to be wide in the entire area on the side to be the side cutting edge, and the width gradually decrease as being away from the apex the nose R portion cutting edge on the side to be the end cutting edge.

For the blank material in which a small piece of the cutting tool material 4 is bonded to the base metal 2 so that the upper surface of the cutting tool material 4 projects upward from the upper surface of the base metal 2, the following method may also be adopted: the cutting tool material 4 is bonded to the base metal 2 with pre-ground upper surface 2a and bottom surface 2b, subsequently, only the upper surface of the cutting tool material 4 is ground to form the rake face 7, and the nose R portion 5 and the flank face 6 along with the lateral faces of the base metal are formed in the subsequent grinding.

For the blank material in which the upper surface of the cutting tool material 4 projects upward from the upper surface of the base metal, the supplementary negative land in a shape with a width gradually increased on the linear cutting edge side rather than the nose R portion side can be formed on the side that is used as the side cutting edge of the cutting tool material 4 without simultaneously cutting the base metal.

Also, for the blank material in which the upper surface of the cutting tool material 4 projects upward from the upper surface of the base metal 2, it is also possible to grind only the cutting tool material 4 to provide a rake face with a positive rake angle, and subsequently, and to form the lateral faces of the base metal, the lateral faces (flank faces) of the cutting tool material 4 including the nose R portion, and the negative land 9.

Without providing the supplementary negative land in the negative land 9, after grinding of the rake face is performed, the supplementary negative land can be ground and provided. However, as described above, from the viewpoint of variation in the shape of the negative land, reduction of chipping, improvement of core height accuracy after grinding the negative land, it is preferable that the flank face 6 be first ground, and subsequently the supplementary negative land be ground, and finally, the rake face 7 be ground.

When finishing is performed based on this step, the shape of negative land with unequal width can be controlled while reducing fine chipping which occurs in the cutting edge, and variation in core height h (see FIG. 7) in correlation with the dimensional accuracy of machined parts.

In grinding of the flank face 6, the grinding wheel 12 comes into contact with part of a surface to be machined, and the contact area is varied. On the other hand, in grinding of the rake face 7, the end face of the grinding wheel comes into contact with the entire grinding area in parallel. This probably works effectively to reduce chipping.

In grinding of the flank face 6, as illustrated in FIG. 16, the flank face 6 of the blank material 1A held by the chuck 11 is pressed against the end face of the grinding wheel 12, and a machining area is varied while the chuck 11 being rotated around the axis O.

Figure 17:
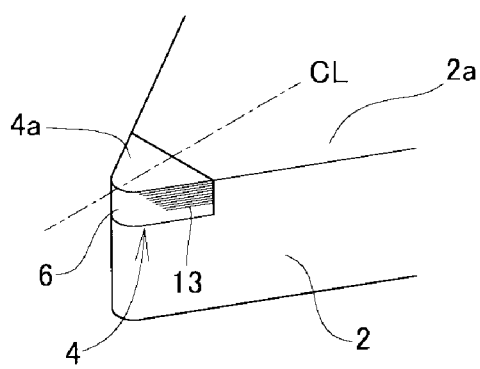
FIG. 17 is a perspective view illustrating polish streaks of a flank face.

Thus, polish streaks 13 (see FIG. 17) perpendicular to the insert thickness direction are formed on the flank face 6. The polish streaks perpendicular to the insert thickness direction mentioned herein do not refer to polish streaks in only completely perpendicular direction and also include polish streaks in a direction somewhat inclined with respect to the line perpendicular to the tool thickness direction in a range without losing cost effectiveness and work simplicity.

The reason for providing perpendicular polish streaks on the flank face, rake face is because the cost at the time of mass production can be made low. It is also allowed to provide diagonal polish streaks in a range in which operational effects are obtained.

In this process, when the flank face 6 of the cutting tool material 4 is flush with the lateral faces of the base metal 2, the lateral faces of the base metal 2 are also ground simultaneously. Since a small piece of the cutting tool material 4 does not have much thickness, this machining does not cause non-negligible edge dullness in the flank face. When the flank face 6 projects from the lateral faces of the base metal 2, only the flank face 6 is machined in the process.

Next, the rake face 7 is ground. The machining is performed without releasing and holding the blank material 1A by the chuck 11. The chuck 11 holding the blank material 1A is rotated in the b-axis direction of FIG. 16, and as illustrated in FIG. 18, the upper surface of the cutting tool material 4 is pressed against the end face of the grinding wheel 12.

At this point, when only the cutting tool material 4 is allowed to be ground by the pressing the blank material 1A against the grinding wheel 12, simultaneously cutting of two types of materials having different hardness does not occur, and a sharp grinding surface, which has a reduced grinding area and has undergone dressing as necessary, can be used. In addition, a finished cutting insert has better appearance.

When the upper surface of the cutting tool material 4 projects from the upper surface of the base metal 2, it is easy to grind only the cutting tool material 4.

However, as long as a grinding area allows no adverse effect of simultaneous cutting, part of the base metal 2 along with the upper surface of the cutting tool material may be ground. In a situation where the edge of the grinding face enters into the base metal 2 side by approximately 2 mm for instance, adverse effect of simultaneous cutting does not develop.

Figure 19:
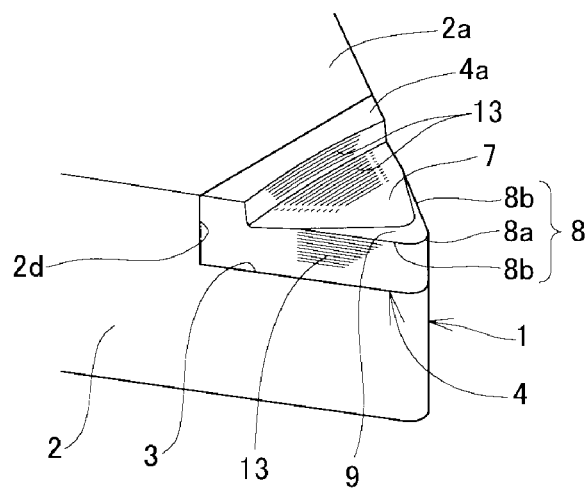
FIG. 19 is a perspective view illustrating polish streaks of the rake face.

Grinding of the rake face 7 is performed so that the polish streaks 13 are formed in a perpendicular direction to the bisector CL of the corner portion of the cutting insert, provided with the cutting tool material 4 as illustrated in FIG. 19.

When the rake face is pressed against the end face of the grinding wheel in rotation, the polish streaks formed on the rake face are not lines but arcs in a strict sense. Therefore, "the polish streaks are formed in a perpendicular direction to the bisector of the corner portion" indicates arc-shaped polish streaks close to lines, but not lines in a strict sense.

Figure 20:
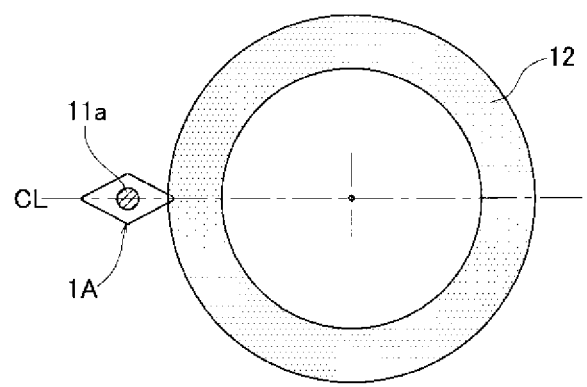
FIG. 20 is a front view illustrating a grinding state of the rake face.

As illustrated in FIG. 20, when grinding is performed in a posture where the bisector CL of the corner portion is placed on an imaginary line extending radially from the rotational center of the grinding wheel 12, arc-shaped polish streaks 13 with the center at the rotational center of the grinding wheel 12 are formed on the rake face 7.

The grinding wheel 12 with a radius on the order of 50 mm to 300 mm is used in general, and when a grinding wheel with a radius of 300 mm is used now, the polish streaks 13 are streaks having a radius of approximately 300 mm. Since the cutting insert is not so large, the streaks look like lines.

When the flank face 6 and the rake face 7 are ground together by the end face of the same grinding wheel, the ratio of the surface roughnesses of the flank face 6 and the rake face 7 is close to 1.

Figure 5:
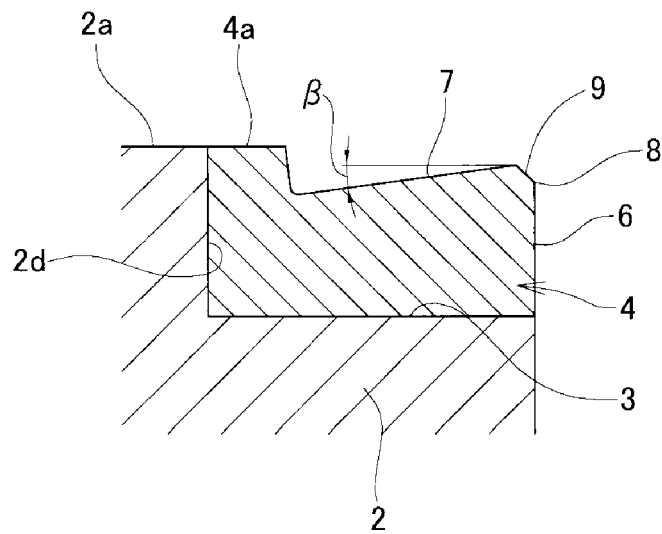
FIG. 5 is a sectional view taken along line V-V of FIG. 4.
Figure 6:
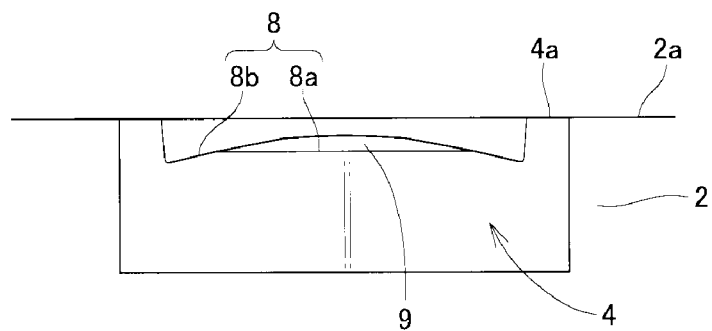
FIG. 6 is a front view of the nose R portion of FIG. 5.
Figure 7:
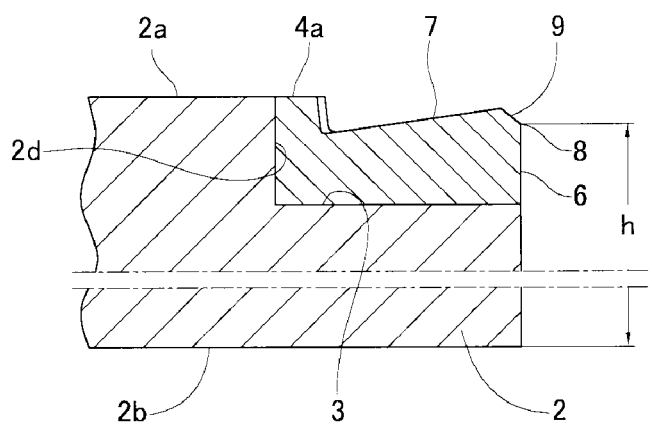
FIG. 7 is an enlarged sectional view illustrating part of FIG. 2.

When the blank material 1A, in which the upper surface 2a of the base metal 2 is flush with the upper surface 4a of the cutting tool material 4 before grinding, is provided with the rake face 7 by performing grinding, as illustrated in FIG. 5, FIG. 7, the upper end of the rake face 7 may be slightly lower than the upper surface 2a of the base metal (in a negative type cutting insert having the same structure of the upper and lower surfaces, the lower surface is also considered to be the upper surface), which arises particularly no problem.

The above grinding is performed by what is called one chuck without changing the holding state of the blank material 1A by the chuck 11.

This prevents positional displacement caused by releasing and holding the blank material. Also, grinding of the rake face is performed in a situation where the base metal is not simultaneously cut, thereby significantly improving the accuracy of the core height h (see FIG. 7, the height from the bearing surface which supports the cutting insert to a machining point) also.

Also, grinding of the rake face is substantially performed on the cutting tool material 4, thereby making it possible to reduce the inclination angle θ of the negative land 9 and the width of the negative land on the end cutting edge side lower than those of a conventional product. Consequently, further improvement in core high accuracy and improvement in sharpness can be achieved.

For a trial cutting insert for which grinding was performed using a cup grinding wheel with No. 1400, tolerances of the core quantity H could fall within ±10 µm, and furthermore, tolerances also could fall within ±10 µm with the negative land inclination angle θ=15° or less, and the width of the negative land of 0.1 mm (100 µm). In addition, machining of a negative land with the inclination angle θ=5°, which has been impossible in the past was made impossible.

According to the method illustrated, a cutting insert with high core height accuracy can be manufactured as described above, and thus when a mass-produced cutting insert is used, trial cutting for adjusting the core height is unnecessary, and uses of cutting inserts will receive a significant benefit. The illustrated method is a method of making a cutting insert simply using equipment for general outer periphery polishing, and the machining method is not limited if the present functional effect is obtained.

The above description has been provided by giving an example of steps of grinding the flank face, and grinding the rake face. However, even with the steps of grounding the rake face first and subsequently, grounding the flank face, core height accuracy and accuracy of negative land are improved compared with conventional products. This is because performing each grinding process by one chuck, and grinding the rake face so that the cutting tool material serves as an object to be substantially ground work effectively.

The dimensional accuracy of a machined work improves as the core height accuracy of the cutting insert increases. Also, when the shape accuracy of the nose R portion, the dimension of an inscribed circle, and particularly, the negative land with unequal width provided in the cutting edge ridge line portion is improved, the variation in cutting edge positions and cutting resistances between cutting inserts is reduced, a stable tool life is achieved in finish cutting of a difficult-to-cut material, quality of machining is also stable, and a machined surface with excellent surface texture is obtained.

It is possible to perform round honing machining on the cutting edge portion as necessary to enhance the effect of reinforcement of the cutting edge portion (14 of FIG. 11 indicates a round honing face). The width of the round honing face 14 is preferably 0.03 mm to 0.3 mm, or more preferably of the order of 0.0005 mm to 0.06 mm in order to reduce degradation of sharpness due to excessive blunting.

Hereinafter more detailed embodiments of this invention will be presented.

-Embodiment 1-

The cutting inserts, which are indicated by the samples No. 1 to No. 53 of Table I and in which a cutting tool material of a hard sintered body is applied to the surface of a corner portion involved in cutting of a base metal, were produced experimentally, and cutting evaluation was conducted under the conditions described below.

The cutting tool material is such that cBN powder and bonding material powder consisting of TiN and Al were mixed by a ball mill, and sintered using an ultra-high pressure device under the condition of 5 GPa, 1500° C. A cBN sintered body was used that contains 60% volume ratio of cBN particles with an average particle diameter of 1 µm, and the remaining consists of Ti compound composed mainly of Tin, Al compound such as a nitride, a boride, an oxide of Al or Si, and very small quantity of W or Co compound.

For this cutting insert, a blank material in which a small piece of the cutting tool material is braze joined to carbide base metal for ISO model number CNGA120404 was automatically ground by subsequent automatic grinding using a grinder to automatically machine a nose R portion, an insert lateral face, and a flank face. At the time of outer periphery grinding machining, an outer circumferential portion forming a flank face of two sides including the nose R is ground by adjusting the angle with which the outer circumferential portion is pressed against a grinding wheel, then an insert geometry having an apex angle of 30° to 90°, a flank angle of 0° was produced. For each of inserts having an apex angle other than 80°, at the time of mounting a cutting insert in the shape of ISO model number CNGA120404, the cutting insert was mounted on a holder for achieving cutting geometry described in the embodiment, and cutting was performed.

For the blank materials other than No. 41, before automatic grinding machining of the nose R portion, the insert lateral face, and the flank face by automatic grinding, the bottom surface and the upper surface together with the cutting tool material were simultaneously cut by a planar grinder so that the thickness was adjusted to 4.80 mm. Similarly, for No. 41, a blank material having a thickness of 4.80 mm, composed of a hard sintered body of the same material as the cutting tool material in its entirety was also prepared.

For these blank materials, part or all of grinding process was conducted by the grinding device 400 COMBI manufactured by Agathon AG, and cutting inserts having various cutting edge geometries in Table I were finished.

For the cutting inserts of No. 1 to No. 14 in Table I, a small piece of the cutting tool material was braze joined to the base metal, then grinding machining was performed on the blank material, and desired insert geometry and various cutting edge geometries were obtained.

The cutting inserts of No. 1 to No. 6 are a conventional product in which the outer periphery was machined by automatic grinding to form an insert lateral face, a nose R portion, a flank face, then holding by the chuck was released, and subsequently, a grinding face of a grinding wheel in rotation, inclined by a specific angle is brought into contact with a cutting edge ridge line portion, and a negative land was formed with the constant angle while a support shaft is rotated, and so the cutting inserts have a rake angle of 0°, and a constant width with no gradual decrease from the apex of the nose R portion cutting edge to a position at which the nose R portion cutting edge is connected to a linear cutting edge.

Similarly to the cutting inserts of No. 1 to No. 6, for the cutting insert of No. 20, after up to the outer periphery was machined, a negative land was manually formed with no gradual decrease of width from the apex of the nose R portion cutting edge to a position at which the nose R portion cutting edge is connected to a linear cutting edge, so that the cutting insert has a negative land with a constant width of W1 at the nose R portion, and a negative land shaped in a step form with a constant width of W2 from the position connecting to the linear cutting edge.

The cutting inserts of No. 7, No. 8 are a conventional product in which the rake face was ground in parallel with the insert bottom surface by a planar grinder, then grinding machining was performed on the outer periphery with the insert clamped by the chuck in the thickness direction to form an insert lateral face, a nose R portion, and a flank face, then the holding by the chuck was released, and subsequently, an insert is mounted with inclination on a planar grinder, grinding machining was performed on the rake face, and finally, a grinding face of a grinding wheel in rotation, inclined by a specific angle is brought into contact with a cutting edge ridge line portion, and a negative land was formed with the constant angle while a support shaft is rotated.

Similarly to the cutting inserts of No. 7, No. 8, for the cutting insert of No. 25, after up to the rake face was machined, honing treatment was performed on the cutting edge by a brush honing device without forming a negative land.

Each of the cutting inserts of No. 9 to No. 19, No. 21 to No. 24, and No. 26 to No. 53 was produced by a manufacturing method in which even after machining of the outer periphery is performed, a state of holding of the blank material by the chuck is not released, and subsequently, a supplementary negative land is ground, and further subsequently, the rake face is ground. No. 9 to No. 19, No. 21 to No. 23, No. 27 to No. 34, No. 37 to No. 39, and No. 41 to No. 53 have the tool geometry of the present invention.

For the cutting inserts of No. 25, No. 42 to No. 45, machining of the outer periphery, machining of the negative land, and machining of the rake face were performed, then a round honing of 0.0005 μm in plan view was formed on the cutting edge by a brush honing device.

For the cutting inserts of No. 46 to No. 49, machining of the outer periphery, machining of the negative land, and machining of the rake face were performed, then a round honing of 0.02 μm in plan view was formed on the cutting edge by a brush honing device.

For the cutting inserts of No. 50 to No. 53, after machining of the outer periphery was performed, a state of holding of the blank material by the chuck was not released, the rake face was machined without grinding the negative land, and subsequently, a brush is pressed from the flank face side of the nose R portion by a brush honing device, and a round honing of 0.03 to 0.06 μm in plan view thereby was formed on the cutting edge.

These cutting inserts were each evaluated with mounted in a tool holder for the below-described cutting geometry by cutting the below-mentioned workpiece under the conditions described below.

Cutting edge inclination angle=−5°, side rake angle=−5°, end flank angle=5°, side flank angle=5°, end cutting edge angle=5°, side cutting edge angle=−5°

Workpiece: heat treatment material with JIS model number of SUJ2 (ASTM52100)

Cutting Conditions

Workpiece hardness: HRc 60-62

Cutting speed V=150 mm/min

Depth of cut d=0.15 mm

Feed rate f=0.14 mm/rev

Coolant: Not provided

Type of machining: continuous machining of outer periphery

The result of this evaluation test is summarized in Table I.

TABLE I

Data on geometry of insert after cutting edge processing

| Sample No. | Nose R radius (mm) | Apex angle α (°) | Negative land angle (°) | Rake angle β (°) | Negative land width W1 (mm) | Negative land width W2 (mm) | Ratio of negative land widths W1/W2 | Core height h (mm) | Maximum chipping amount of cutting edge ridge line (mm) | Cutting time until damage occurs (min) | Surface roughness (Rz) | Presence of chatter |
|---|---|---|---|---|---|---|---|---|---|---|---|---|
| 1 | 0.4 | 55 | −20 | 0 | 0.060 | 0.055 | 1.09 | 4.78 | 0.02 | 3 | 15.2 | Present |
| 2 | 0.8 | 55 | −20 | 0 | 0.060 | 0.055 | 1.09 | 4.76 | 0.02 | 4 | 12.1 | Present |
| 3 | 1.2 | 55 | −20 | 0 | 0.060 | 0.055 | 1.09 | 4.78 | 0.02 | 4 | 11.0 | Present |
| 4 | 1.6 | 55 | −20 | 0 | 0.060 | 0.055 | 1.09 | 4.76 | 0.02 | 4 | 11.1 | Present |
| 5 | 2.0 | 55 | −20 | 0 | 0.060 | 0.055 | 1.09 | 4.76 | 0.02 | 3 | 11.2 | Present |
| 6 | 2.4 | 55 | −20 | 0 | 0.060 | 0.055 | 1.09 | 4.76 | 0.02 | 3 | 11.3 | Present |
| 7 | 0.8 | 55 | −20 | 3 | 0.060 | 0.020 | 3.0 | 4.50 | 0.06 | 7 | 9.0 | Not present |
| 8 | 1.2 | 55 | −20 | 3 | 0.060 | 0.020 | 3.0 | 4.60 | 0.06 | 7 | 7.0 | Not present |
| 9 | 0.4 | 55 | −20 | 3 | 0.060 | 0.020 | 3.0 | 4.78 | 0.005 | 12 | 6.2 | Not present |
| 10 | 0.8 | 55 | −20 | 3 | 0.060 | 0.020 | 3.0 | 4.76 | 0.005 | 14 | 3.1 | Not present |
| 11 | 1.2 | 55 | −20 | 3 | 0.060 | 0.020 | 3.0 | 4.76 | 0.005 | 19 | 2.0 | Not present |
| 12 | 1.6 | 55 | −20 | 3 | 0.060 | 0.020 | 3.0 | 4.78 | 0.005 | 18 | 2.1 | Not present |
| 13 | 2.0 | 55 | −20 | 3 | 0.060 | 0.020 | 3.0 | 4.76 | 0.005 | 16 | 2.2 | Not present |
| 14 | 2.4 | 55 | −20 | 3 | 0.060 | 0.020 | 3.0 | 4.76 | 0.005 | 14 | 2.3 | Not present |
| 15 | 1.2 | 30 | −20 | 3 | 0.060 | 0.020 | 3.0 | 4.76 | 0.005 | 12 | 2.1 | Not present |
| 16 | 1.2 | 35 | −20 | 3 | 0.060 | 0.020 | 3.0 | 4.76 | 0.005 | 14 | 3.1 | Not present |
| 17 | 1.2 | 60 | −20 | 3 | 0.060 | 0.020 | 3.0 | 4.76 | 0.005 | 17 | 2.1 | Not present |
| 18 | 1.2 | 80 | −20 | 3 | 0.060 | 0.020 | 3.0 | 4.76 | 0.005 | 19 | 2.0 | Not present |
| 19 | 1.2 | 90 | −20 | 3 | 0.060 | 0.020 | 3.0 | 4.76 | 0.005 | 16 | 2.3 | Not present |
| 20 | 1.2 | 55 | −20 | 0 | 0.060 | 0.020 | 3.0 | 4.76 | 0.004 | 4 | 12.3 | Present |
| 21 | 1.2 | 55 | −20 | 1 | 0.060 | 0.020 | 3.0 | 4.76 | 0.004 | 16 | 2.1 | Not present |
| 22 | 1.2 | 55 | −20 | 7 | 0.060 | 0.020 | 3.0 | 4.77 | 0.004 | 13 | 2.2 | Not present |
| 23 | 1.2 | 55 | −20 | 10 | 0.060 | 0.020 | 3.0 | 4.76 | 0.004 | 11 | 2.3 | Not present |
| 24 | 1.2 | 55 | −20 | 12 | 0.060 | 0.020 | 3.0 | 4.76 | 0.015 | 3 | 12.5 | Present |
| 25 | 1.2 | 55 | NA | 3 | 0.005 | 0.005 | 1.0 | 4.76 | 0.05 | 2 | 2.8 | Not present |
| 26 | 1.2 | 55 | −20 | 3 | 0.060 | 0.055 | 1.09 | 4.76 | 0.02 | 7 | 13.5 | Present |
| 27 | 1.2 | 55 | −20 | 3 | 0.060 | 0.040 | 1.50 | 4.78 | 0.004 | 15 | 2.3 | Not present |
| 28 | 1.2 | 55 | −20 | 3 | 0.060 | 0.005 | 12.0 | 4.76 | 0.004 | 20 | 1.8 | Not present |

TABLE I-continued

Data on geometry of insert after cutting edge processing

| Sample No. | Nose R radius (mm) | Apex angle α (°) | Negative land angle (°) | Rake angle β (°) | Negative land width W1 (mm) | Negative land width W2 (mm) | Ratio of negative land widths W1/W2 | Core height h (mm) | Maximum chipping amount of cutting edge ridge line (mm) | Cutting time until damage occurs (min) | Surface roughness (Rz) | Presence of chatter |
|---|---|---|---|---|---|---|---|---|---|---|---|---|
| 29 | 1.2 | 55 | −20 | 3 | 0.060 | 0.003 | 20 | 4.76 | 0.004 | 18 | 1.9 | Not present |
| 30 | 1.2 | 55 | −20 | 3 | 0.060 | 0.001 | 60.0 | 4.76 | 0.004 | 17 | 2.0 | Not present |
| 31 | 1.2 | 55 | −20 | 3 | 0.02 | 0.001 | 20 | 4.76 | 0.005 | 3 | 2.5 | Not present |
| 32 | 1.2 | 55 | −20 | 3 | 0.04 | 0.001 | 40 | 4.77 | 0.005 | 14 | 2.2 | Not present |
| 33 | 1.2 | 55 | −20 | 3 | 0.100 | 0.0005 | 200 | 4.76 | 0.005 | 16 | 2.2 | Not present |
| 34 | 1.2 | 55 | −20 | 3 | 0.200 | 0.0005 | 400 | 4.76 | 0.005 | 13 | 2.8 | Not present |
| 35 | 1.2 | 55 | −20 | 3 | 0.210 | 0.0005 | 420 | 4.76 | 0.005 | 10 | 9 | Present |
| 36 | 1.2 | 55 | −5 | 3 | 0.060 | 0.020 | 3.0 | 4.77 | 0.005 | 3 | 2.5 | Not present |
| 37 | 1.2 | 55 | −10 | 3 | 0.060 | 0.020 | 3.0 | 4.76 | 0.005 | 13 | 2.3 | Not present |
| 38 | 1.2 | 55 | −30 | 3 | 0.060 | 0.020 | 3.0 | 4.77 | 0.005 | 19 | 2.3 | Not present |
| 39 | 1.2 | 55 | −45 | 3 | 0.060 | 0.020 | 3.0 | 4.76 | 0.005 | 17 | 2.7 | Not present |
| 40 | 1.2 | 55 | −50 | 3 | 0.060 | 0.020 | 3.0 | 4.76 | 0.005 | 9 | 8 | Present |
| 41 | 1.2 | 55 | −20 | 3 | 0.060 | 0.020 | 3.0 | 4.78 | 0.007 | 19 | 2.1 | Not present |
| 42 | 1.2 | 55 | −20 | 1 | 0.060 | 0.020 | 3.0 | 4.76 | 0.002 | 19 | 1.8 | Not present |
| 43 | 1.2 | 55 | −20 | 3 | 0.060 | 0.020 | 3.0 | 4.76 | 0.003 | 22 | 1.9 | Not present |
| 44 | 1.2 | 55 | −20 | 7 | 0.060 | 0.020 | 3.0 | 4.77 | 0.002 | 16 | 2.0 | Not present |
| 45 | 1.2 | 55 | −20 | 10 | 0.060 | 0.020 | 3.0 | 4.76 | 0.002 | 14 | 2.1 | Not present |
| 46 | 1.2 | 55 | −20 | 1 | 0.060 | 0.020 | 3.0 | 4.76 | 0.002 | 20 | 1.8 | Not present |
| 47 | 1.2 | 55 | −20 | 3 | 0.060 | 0.020 | 3.0 | 4.76 | 0.003 | 23 | 1.9 | Not present |
| 48 | 1.2 | 55 | −20 | 7 | 0.060 | 0.020 | 3.0 | 4.77 | 0.002 | 17 | 2.0 | Not present |
| 49 | 1.2 | 55 | −20 | 10 | 0.060 | 0.020 | 3.0 | 4.76 | 0.002 | 15 | 2.1 | Not present |
| 50 | 1.2 | 55 | −20 | 1 | 0.060 | 0.020 | 3.0 | 4.76 | 0.002 | 20 | 1.8 | Not present |
| 51 | 1.2 | 55 | −20 | 3 | 0.060 | 0.020 | 3.0 | 4.76 | 0.003 | 23 | 1.9 | Not present |
| 52 | 1.2 | 55 | −20 | 7 | 0.060 | 0.020 | 3.0 | 4.77 | 0.002 | 17 | 2.0 | Not present |
| 53 | 1.2 | 55 | −20 | 10 | 0.060 | 0.020 | 3.0 | 4.76 | 0.002 | 15 | 2.1 | Not present |

-Embodiment 2-

The samples No. 61 to No. 72 of Table II indicate such that for a blank material, which is braze joined to carbide base metal for ISO model number CNGA120404 and in which a cutting tool material of a hard sintered body is applied to the surface of a corner portion involved in cutting of the base metal, when outer periphery machining is performed by automatic grinding using a grinder, an outer circumferential portion forming a flank face of two sides including the nose R is ground by adjusting the angle with which the outer circumferential portion is pressed against a grinding wheel, and an insert geometry having an apex angle of 80°, a flank angle of 7° was produced. At the time of mounting a cutting insert of ISO model number CNGA120404, the cutting insert was mounted on a holder for achieving cutting geometry described in the embodiment, and cutting was performed.

The cutting tool material is such that TiC powder, ZrC powder, Al₂O₃ powder, and bonding material powder consisting of TiN and Al were mixed by a ball mill, and sintered using an ultra-high pressure device under the condition of 5 GPa, 1500° C. Ceramics was used that contains 20% volume ratio of each of ZrC, TiC, Al₂O₃ powder with an average particle diameter of 1 μm, and the remaining consists of Ti compound composed mainly of Tin, Al compound such as a nitride, a boride, an oxide of Al or Si, and very small quantity of W or Co compound.

The cutting inserts of No. 61 to No. 63 are a conventional product in which the rake face was ground in parallel with the insert bottom surface by a planar grinder, then the outer periphery was machined by automatic grinding to form an insert lateral face, a nose R portion, and a flank face, then the holding by the chuck was released, and subsequently, a grinding face of a grinding wheel in rotation, inclined by a specific angle is brought into contact with a cutting edge ridge line portion, and a negative land was formed with the constant angle while a support shaft is rotated, and so the cutting inserts have a rake angle of 0°, and a constant width with no gradual decrease from the apex of the nose R portion cutting edge to a position at which the nose R portion cutting edge is connected to a linear cutting edge.

Each of the cutting inserts of No. 64 to No. 66 was produced by a manufacturing method in which even after machining of the outer periphery is performed, a state of holding of the blank material by the chuck is not released, and subsequently, a supplementary negative land is ground, and further subsequently, the rake face is ground. The cutting inserts have the tool geometry of the present invention, the tool geometry having a negative land whose width gradually decreases from the apex of the nose R to a position at which the nose R portion cutting edge is connected to a linear cutting edge.

For the cutting inserts of No. 67 to No. 72 also, a manufacturing method is adopted in which even after machining of the outer periphery is performed, a state of holding of the blank material by the chuck is not released, and subsequently, a supplementary negative land is ground, and further subsequently, the rake face is ground. The cutting inserts have the tool geometry of the present invention, in which a negative land is formed by the manufacturing method, the negative land gradually decreasing from the apex of the nose R to a position at which the nose R portion cutting edge is connected to a linear cutting edge, and subsequently, by manual machining using a leutor, a negative land with a constant width was formed only on the cutting edge on one side, the negative land having no gradual decrease in width from the apex of the nose R portion cutting edge to a position at which the nose R portion cutting edge is connected to a linear cutting edge.

For the cutting inserts of No. 70 to No. 72, after a negative land was formed, a round honing of 0.005 mm in plan view was formed by a brush honing device.

These cutting inserts were each evaluated with mounted in a tool holder for the below-described cutting geometry by cutting the below-mentioned workpiece under the conditions described below.

Cutting edge inclination angle=−5°, side rake angle=−5°, end flank angle=5°, side flank angle=5°, end cutting edge angle=5°, side cutting edge angle=−5°

Workpiece: heat treatment material with HS model number of NCF718 (AMS5662)

Cutting Conditions

Workpiece hardness: HRc 43-44

Cutting speed V=200 mm/min

Depth of cut d=0.25 mm

Feed rate f=0.2 mm/rev

Coolant: Provided (wet cutting)

Type of machining: continuous machining of end face

The result of this evaluation test is summarized in Table II.

and sintered using an ultra-high pressure device under the condition of 5 GPa, 1500° C. Ceramics was used that contains 59% volume ratio of cBN powder with an average particle diameter of 1 μm, 7% volume ratio of each of ZrC, TiC, $Al_2O_3$ powder, and the remaining consists of Ti compound composed mainly of Tin, Al compound such as a nitride, a boride, an oxide of Al or Si, and very small quantity of W or Co compound.

The cutting inserts of No. 71 to No. 73 are a conventional product in which the rake face was ground in parallel with the insert bottom surface by a planar grinder, then the outer periphery was machined by automatic grinding to form an insert lateral face, a nose R portion, and a flank face, then the holding by the chuck was released, and subsequently, a grinding face of a grinding wheel in rotation, inclined by a specific angle is brought into contact with a cutting edge ridge line portion, and a negative land was formed with the constant angle while a support shaft is rotated, and so the cutting inserts have a rake angle of 0°, and a constant width with no gradual decrease from the apex of the nose R portion cutting edge to a position at which the nose R portion cutting edge is connected to a linear cutting edge.

TABLE II

| | Data on geometry of insert after cutting edge processing | | | | | | | | Result of cutting | | |
| --- | --- | --- | --- | --- | --- | --- | --- | --- | --- | --- | --- |
| Sample No. | Nose R radius (mm) | Apex angle α (°) | Negative land angle (°) | Rake angle β (°) | Negative land width W1 (mm) | Negative land width W2 (mm) | Ratio of negative land widths W1/W2 | Negative land on left side of apex with nose R (end cutting edge side) *1 | Negative land on right side of apex with nose R (side cutting edge side) *2 | Cutting time until damage occurs (min) | Thickness of affected layer (μm) | Presence of chatter (μm) |
| 61 | 0.8 | 80 | −20 | 0 | 0.060 | 0.060 | 1 | Constant | Constant | 2 | 30 | Present |
| 62 | 1.2 | 80 | −20 | 0 | 0.060 | 0.060 | 1 | Constant | Constant | 2 | 30 | Present |
| 63 | 1.6 | 80 | −20 | 0 | 0.060 | 0.055 | 1.09 | Constant | Constant | 2 | 30 | Present |
| 64 | 0.8 | 80 | −20 | 3 | 0.060 | 0.001 | 60 | Gradual decrease | Gradual decrease | 6 | 5 | Not present |
| 65 | 1.2 | 80 | −20 | 3 | 0.060 | 0.001 | 60 | Gradual decrease | Gradual decrease | 7 | 5 | Not present |
| 66 | 1.6 | 80 | −20 | 3 | 0.060 | 0.001 | 60 | Gradual decrease | Gradual decrease | 8 | 6 | Not present |
| 67 | 0.8 | 80 | −20 | 3 | 0.060 | 0.001 | 60 | Gradual decrease | Constant | 12 | 5 | Not present |
| 68 | 1.2 | 80 | −20 | 3 | 0.060 | 0.001 | 60 | Gradual decrease | Constant | 15 | 5 | Not present |
| 69 | 1.6 | 80 | −20 | 3 | 0.060 | 0.001 | 60 | Gradual decrease | Constant | 16 | 6 | Not present |
| 70 | 0.8 | 80 | −20 | 3 | 0.065 | 0.006 | 10.8 | Gradual decrease | Constant | 14 | 6 | Not present |
| 71 | 1.2 | 80 | −20 | 3 | 0.065 | 0.006 | 10.8 | Gradual decrease | Constant | 16 | 6 | Not present |
| 72 | 1.6 | 80 | −20 | 3 | 0.065 | 0.000 | 10.8 | Gradual decrease | Constant | 17 | 7 | Not present |

*1 Left side when nose R is viewed from flank face with rake face of cutting edge used for cutting facing upward
*2 Right side when nose R is viewed from flank face with rake face of cutting edge used for cutting facing upward -Embodiment 3-

For a blank material, which is braze joined to carbide base metal for ISO model number DNGA150404 and in which several types of cutting tool material of hard sintered body with different geometries are applied to the surface of a corner portion involved in cutting of the base metal, a nose R portion, an insert lateral face, and a flank face were machined by subsequent automatic grinding using an automatic grinder, and trial cutting inserts (samples No. 71 to No. 90 of Table III) for DNGA150408, DNGA150412, and DNGA150416 were obtained. Each cutting insert was evaluated under the conditions described below.

The cutting tool material is such that cBN powder, TiC powder, ZrC powder, $Al_2O_3$ powder, and bonding material powder consisting of TiN and Al were mixed by a ball mill, Each of the cutting inserts of No. 74 to No. 76 was produced by a manufacturing method in which even after machining of the outer periphery is performed, a state of holding of the blank material by the chuck is not released, and subsequently, a supplementary negative land is ground, and further subsequently, the rake face is ground. The cutting inserts have the tool geometry of the present invention, the tool geometry having a negative land that gradually decreases from the apex of the nose R to a position at which the nose R portion cutting edge is connected to a linear cutting edge.

For the cutting inserts of No. 77 to No. 79 also, a manufacturing method is adopted in which even after machining of the outer periphery is performed, a state of holding of the blank material by the chuck is not released, and subsequently, a supplementary negative land is ground, and further subsequently, the rake face is ground. The cutting inserts have the tool geometry of the present invention, in which a negative land is formed by the manufacturing method, the negative land gradually decreasing from the apex of the nose R to a position at which the nose R portion cutting edge is connected to a linear cutting edge, and subsequently, by manual machining using a hand grinder (trade name: leutor), a negative land with a constant width was formed only on the cutting edge on one side, the negative land having no gradual decrease in width from the apex of the nose R portion cutting edge to a position at which the nose R portion cutting edge is connected to a linear cutting edge.

For the cutting inserts of No. 80 to No. 87 also, a manufacturing method is adopted in which even after machining of the outer periphery is performed, a state of holding of the blank material by the chuck is not released, and subsequently, on the side that is used as the side cutting edge, a supplementary negative land is ground in a shape such that the width gradually increases on the linear cutting edge side rather than the nose R portion side, and further subsequently, the rake face is ground. The cutting inserts have the tool geometry of the present invention, the tool geometry having, on the side of cutting edge for the end cutting edge, a negative land that gradually decreases from the apex of the nose R to a position at which the nose R portion cutting edge is connected to a linear cutting edge, the tool geometry having, on the side of cutting edge for the side cutting edge, a negative land that is constant or gradually increases from the apex of the nose R to a position at which the nose R portion cutting edge is connected to a linear cutting edge.

Each of the cutting inserts was evaluated with mounted in a tool holder for the below-described cutting geometry by cutting the below-mentioned workpiece under the conditions described below.

Cutting edge inclination angle=−7°, side rake angle=−5°, end flank angle=7°, side flank angle=5°, end cutting edge angle=32°, side cutting edge angle=−3°

Workpiece: heat treatment material with HS model number of NCF718 (AMS5662)

Cutting Conditions

Workpiece hardness: HRc 43-44

Cutting speed V=300 mm/min

Depth of cut d=0.25 mm

Feed rate f=0.2 mm/rev

Coolant: Provided (wet cutting)

Type of machining: continuous machining of outer periphery

The result of this evaluation test is summarized in Table III.

TABLE III

Data on geometry of insert after cutting edge processing

| Sample No. | Nose R radius (mm) | Apex angle α (°) | Negative land angle (°) | Rake angle β (°) | Negative land width W1 (mm) | Negative land width W2 (mm) | Ratio of negative land widths W1/W2 | Negative land on left side of apex with nose R (side cutting edge side) *1 | Negative land on right side of apex with nose R (end cutting edge side) *2 | Ratio of M1 to M2 of chamfer of cemented carbide | Cutting time until damage occurs (min) | Presence of chatter (μm) |
|---|---|---|---|---|---|---|---|---|---|---|---|---|
| 71 | 0.8 | 55 | −20 | 0 | 0.060 | 0.060 | 1 | Constant | Constant | — | 0.5 | Present |
| 72 | 1.2 | 55 | −20 | 0 | 0.060 | 0.060 | 1 | Constant | Constant | — | 0.75 | Present |
| 73 | 1.6 | 55 | −20 | 0 | 0.060 | 0.055 | 1.09 | Constant | Constant | — | 1 | Present |
| 74 | 0.8 | 55 | −20 | 3 | 0.060 | 0.005 | 12 | Gradual decrease | Gradual decrease | — | 3 | Not present |
| 75 | 1.2 | 55 | −20 | 3 | 0.060 | 0.005 | 12 | Gradual decrease | Gradual decrease | — | 4 | Not present |
| 76 | 1.6 | 55 | −20 | 3 | 0.060 | 0.005 | 12 | Gradual decrease | Gradual decrease | — | 5 | Not present |
| 77 | 0.8 | 55 | −20 | 3 | 0.060 | 0.005 | 12 | Constant | Gradual decrease | — | 6 | Not present |
| 78 | 1.2 | 55 | −20 | 3 | 0.060 | 0.005 | 12 | Constant | Gradual decrease | — | 8 | Not present |
| 79 | 1.6 | 55 | −20 | 3 | 0.060 | 0.005 | 12 | Constant | Gradual decrease | — | 9 | Not present |
| 80 | 0.8 | 55 | −20 | 3 | 0.060 | 0.005 | 12 | Constant | Gradual decrease | 1.2 | 11 | Not present |
| 81 | 1.2 | 55 | −20 | 3 | 0.060 | 0.005 | 12 | Constant | Gradual decrease | 40 | 15 | Not present |
| 82 | 1.6 | 55 | −20 | 3 | 0.060 | 0.005 | 12 | Gradual increase | Gradual decrease | 100 | 14 | Not present |
| 83 | 1.2 | 55 | −20 | 3 | 0.060 | 0.005 | 12 | Gradual decrease | Gradual decrease | 0.8 | 9 | Not present |
| 84 | 1.2 | 55 | −20 | 3 | 0.060 | 0.005 | 12 | Constant | Gradual decrease | 20 | 12 | Not present |
| 85 | 1.2 | 55 | −20 | 3 | 0.060 | 0.005 | 12 | Constant | Gradual decrease | 40 | 15 | Not present |
| 86 | 1.2 | 55 | −20 | 3 | 0.060 | 0.005 | 12 | Gradual increase | Gradual decrease | 70 | 15 | Not present |
| 87 | 1.2 | 55 | −20 | 3 | 0.060 | 0.005 | 12 | Gradual increase | Gradual decrease | 150 | 9 | Not present |
| 88 | 0.8 | 55 | −20 | 3 | 0.072 | 0.006 | 12 | Constant | Gradual decrease | 1.2 | 12 | Not present |

TABLE III-continued

Data on geometry of insert after cutting edge processing

| Sample No. | Nose R radius (mm) | Apex angle α (°) | Negative land angle (°) | Rake angle β (°) | Negative land width W1 (mm) | Negative land width W2 (mm) | Ratio of negative land widths W1/W2 | Negative land on left side of apex with nose R (side cutting edge side) *1 | Negative land on right side of apex with nose R (end cutting edge side) *2 | Ratio of M1 to M2 of chamfer of cemented carbide | Cutting time until damage occurs (min) | Presence of chatter (μm) |
|---|---|---|---|---|---|---|---|---|---|---|---|---|
| 89 | 1.2 | 55 | −20 | 3 | 0.072 | 0.006 | 12 | Constant | Gradual decrease | 40 | 16 | Not present |
| 90 | 1.6 | 55 | −20 | 3 | 0.072 | 0.006 | 12 | Gradual increase | Gradual decrease | 100 | 15 | Not present |

*1 Left side when nose R is viewed from flank face with rake face of cutting edge used for cutting facing upward
*2 Right side when nose R is viewed from flank face with rake face of cutting edge used for cutting facing upward -Embodiment 4-

The cutting inserts, which are indicated by the samples No. 91 to No. 143 of Table IV and in which several types of cutting tool material of hard sintered body with different geometries are applied to the surface of a corner portion involved in cutting of a base metal, were produced experimentally, and cutting evaluation was conducted under the conditions described below.

The cutting tool material is such that cBN powder and bonding material powder consisting of TiN and Al were mixed by a ball mill, and sintered using an ultra-high pressure device under the condition of 5 GPa, 1500° C. A cBN sintered body was used that contains 60% volume ratio of cBN particles with an average particle diameter of 1 μm, and the remaining consists of Ti compound composed mainly of Tin, Al compound such as a nitride, a boride, an oxide of Al or Si, and very small quantity of W or Co compound.

For the cutting inserts except for No. 131, a blank material in which a small piece of the cutting tool material is braze joined to carbide base metal for ISO model number DNGA150404 was automatically ground by subsequent automatic grinding using a grinder to automatically machine a nose R portion, an insert lateral face, and a flank face, and thus an insert geometry was created.

For the blank materials other than No. 131, before outer periphery machining by automatic grinding of the nose R portion, the insert lateral face, and the flank face by automatic grinding, the bottom surface and the upper surface together with the cutting tool material were simultaneously cut by a planar grinder so that the thickness was adjusted to 4.90 mm. No. 131 is a blank material having a thickness of 4.90 mm, composed of a hard sintered body of the same material as the cutting tool material in its entirety.

For these blank materials, part or all of grinding process was conducted by the grinding device 400 COMBI manufacture by Agathon AG, and cutting inserts having various cutting edge geometries in Table IV were finished.

For the cutting inserts of No. 91 to No. 104 in Table IV, a small piece of the cutting tool material was braze joined to the base metal, then grinding machining was performed on the blank material, and desired insert geometry and various cutting edge geometries were obtained.

Also, for the cutting inserts of No. 105 to No. 109, at the time of automatic grinding, an outer circumferential portion forming a flank face of two sides including the nose R is ground by adjusting the angle with which the outer circumferential portion is pressed against a grinding wheel, then an insert geometry having an apex angle of 30° to 90°, a flank angle of 0° was produced. For each of the inserts having an apex angle other than 55°, at the time of mounting a cutting insert having the geometry of ISO model number DNGA150404, the cutting insert was mounted on a holder for achieving cutting geometry described in the embodiment, and cutting was performed.

The cutting inserts of No. 91 to No. 96 are a conventional product in which the rake face was ground in parallel with the insert bottom surface by a planar grinder, then the outer periphery was machined by automatic grinding with the insert clamped by the chuck in the thickness direction to form an insert lateral face, a nose R portion, and a flank face, then a grinding face of a grinding wheel in rotation, inclined by a specific angle around the axis, as the support shaft, perpendicular to the insert bottom surface (or the rake face) is brought into contact with a cutting edge ridge line portion without releasing the holding by the chuck, and a negative land was formed with the constant angle while the support shaft is rotated, and so the cutting inserts have a rake angle of 0°, and the negative land has a constant width with no gradual decrease from the apex of the nose R portion cutting edge to a position at which the nose R portion cutting edge is connected to a linear cutting edge.

Similarly to the cutting inserts of No. 91 to No. 96, for the cutting insert of No. 110, after up to the outer periphery was machined, then the negative land in the following was manually formed, that is, the negative land has no gradual decrease from the apex of the nose R portion cutting edge to a position at which the nose R portion cutting edge is connected to a linear cutting edge, has a constant width of W1 at the nose R portion, and the negative land is shaped in a step form with a constant width of W2 from the position connecting to the linear cutting edge.

The cutting inserts of No. 97, No. 98 are a conventional product in which the rake face was ground in parallel with the insert bottom surface by a planar grinder, then grinding machining was performed on the outer periphery with the insert clamped by the chuck in the thickness direction to form an insert lateral face, a nose R portion, and a flank face, then the holding by the chuck was released, and subsequently, an insert is mounted with inclination on a planar grinder, grinding machining was performed on the rake face, and finally, a grinding face of a grinding wheel in rotation, inclined by a specific angle is brought into contact with a cutting edge ridge line portion, and a negative land was formed with the constant angle while a support shaft is rotated.

Similarly to the cutting inserts of No. 97, No. 98, for the cutting insert of No. 115, after up to the rake face was machined, honing treatment was performed on the cutting edge by a brush honing device without forming a negative land.

Each of the cutting inserts of No. 99 to No. 109, No. 111 to No. 114, and No. 116 to No. 143 was produced by a method in which even after machining of the outer periphery is performed, a state of holding of the blank material by the chuck is not released, and subsequently, a supplementary negative land is ground, and further subsequently, the rake face is ground. No. 99 to No. 109, No. 111 to No. 113, No. 117 to No. 124, No. 127 to No. 129, and No. 131 to No. 143 have the tool geometry of the present invention.

For the cutting inserts of No. 115 and No. 132 to No. 135, machining of the outer periphery, machining of the negative land, and machining of the rake face were performed, then a round honing of 0.0005 μm in plan view was formed on the cutting edge by a brush honing device.

For the cutting inserts of No. 136 to No. 139, machining of the outer periphery, machining of the negative land, and machining of the rake face were performed, then a round honing of 0.02 μm in plan view was formed on the cutting edge by a brush honing device.

For the cutting inserts of No. 140 to No. 143, after machining of the outer periphery was performed, a state of holding of the blank material by the chuck was not released, and the rake face was machined without grinding the negative land, and subsequently, a brush is pressed from the flank face side of the nose R portion by a brush honing device, and a round honing of 0.02 to 0.06 μm in plan view thereby was formed on the cutting edge.

These cutting inserts were each evaluated with mounted in a tool holder for achieving the below-described cutting geometry by cutting the below-mentioned workpiece under the conditions described below.

Cutting edge inclination angle=−7°, side rake angle=−5°, end flank angle=7°, side flank angle=5°, end cutting edge angle=32°, side cutting edge angle=−3°

Workpiece: heat treatment material with JIS model number of SUJ2 (ASTM52100)

Cutting Conditions

Workpiece hardness: HRc 58-60

Cutting speed V=200 mm/min

Depth of cut d=0.2 mm

Feed rate f=0.13 mm/rev

Coolant: Not provided

Type of machining: continuous machining of outer periphery

The result of this evaluation test is summarized in Table IV.

TABLE IV

| | Data on geometry of insert after cutting edge processing | | | | | | | Maximum | Result of cutting | | |
|---|---|---|---|---|---|---|---|---|---|---|---|
| Sample No. | Nose R radius (mm) | Apex angle α (°) | Negative land angle (°) | Rake angle β (°) | Negative land width W1 (mm) | Negative land width W2 (mm) | Ratio of negative land widths W1/W2 | Core height h (mm) | chipping amount of cutting edge ridge line (mm) | Cutting time until damage occurs (min) | Surface roughness (Rz) | Presence of chatter |
| 91 | 0.4 | 55 | −20 | 0 | 0.060 | 0.050 | 1.2 | 4.78 | 0.02 | 2 | 14.5 | Present |
| 92 | 0.8 | 55 | −20 | 0 | 0.060 | 0.050 | 1.2 | 4.77 | 0.02 | 3 | 13.1 | Present |
| 93 | 1.2 | 55 | −20 | 0 | 0.060 | 0.050 | 1.2 | 4.77 | 0.02 | 4 | 12.2 | Present |
| 94 | 1.6 | 55 | −20 | 0 | 0.060 | 0.050 | 1.2 | 4.77 | 0.02 | 5 | 13.2 | Present |
| 95 | 2.0 | 55 | −20 | 0 | 0.060 | 0.050 | 1.2 | 4.77 | 0.02 | 3 | 12.1 | Present |
| 96 | 2.4 | 55 | −20 | 0 | 0.060 | 0.050 | 1.2 | 4.76 | 0.02 | 3 | 11.8 | Present |
| 97 | 0.8 | 55 | −20 | 3 | 0.060 | 0.020 | 3.0 | 4.90 | 0.07 | 7 | 9.5 | Not present |
| 98 | 1.2 | 55 | −20 | 3 | 0.060 | 0.020 | 3.0 | 4.50 | 0.06 | 7 | 8.0 | Not present |
| 99 | 0.4 | 55 | −20 | 3 | 0.060 | 0.020 | 3.0 | 4.78 | 0.005 | 13 | 7.2 | Not present |
| 100 | 0.8 | 55 | −20 | 3 | 0.060 | 0.020 | 3.0 | 4.77 | 0.005 | 15 | 3.1 | Not present |
| 101 | 1.2 | 55 | −20 | 3 | 0.060 | 0.020 | 3.0 | 4.76 | 0.005 | 19 | 2.0 | Not present |
| 102 | 1.6 | 55 | −20 | 3 | 0.060 | 0.020 | 3.0 | 4.78 | 0.005 | 18 | 2.1 | Not present |
| 103 | 2.0 | 55 | −20 | 3 | 0.060 | 0.020 | 3.0 | 4.77 | 0.005 | 16 | 2.2 | Not present |
| 104 | 2.4 | 55 | −20 | 3 | 0.060 | 0.020 | 3.0 | 4.76 | 0.005 | 14 | 2.3 | Not present |
| 105 | 1.2 | 30 | −20 | 3 | 0.060 | 0.020 | 3.0 | 4.77 | 0.005 | 11 | 2.3 | Not present |
| 106 | 1.2 | 35 | −20 | 3 | 0.060 | 0.020 | 3.0 | 4.76 | 0.005 | 13 | 3.2 | Not present |
| 107 | 1.2 | 60 | −20 | 3 | 0.060 | 0.020 | 3.0 | 4.77 | 0.005 | 17 | 2.4 | Not present |
| 108 | 1.2 | 80 | −20 | 3 | 0.060 | 0.020 | 3.0 | 4.76 | 0.005 | 19 | 2.1 | Not present |
| 109 | 1.2 | 90 | −20 | 3 | 0.060 | 0.020 | 3.0 | 4.76 | 0.005 | 16 | 2.1 | Not present |
| 110 | 1.2 | 55 | −20 | 0 | 0.060 | 0.020 | 3.0 | 4.77 | 0.004 | 3 | 12.2 | Present |
| 111 | 1.2 | 55 | −20 | 1 | 0.060 | 0.020 | 3.0 | 4.76 | 0.004 | 17 | 2.0 | Not present |
| 112 | 1.2 | 55 | −20 | 7 | 0.060 | 0.020 | 3.0 | 4.77 | 0.004 | 13 | 2.1 | Not present |
| 113 | 1.2 | 55 | −20 | 10 | 0.060 | 0.020 | 3.0 | 4.76 | 0.004 | 11 | 2.1 | Not present |
| 114 | 1.2 | 55 | −20 | 12 | 0.060 | 0.020 | 3.0 | 4.76 | 0.015 | 3 | 13.5 | Present |
| 115 | 1.2 | 55 | NA | 3 | 0.005 | 0.005 | 1.0 | 4.76 | 0.05 | 2 | 2.6 | Not present |
| 116 | 1.2 | 55 | −20 | 3 | 0.060 | 0.050 | 1.2 | 4.77 | 0.02 | 4 | 14.5 | Present |
| 117 | 1.2 | 55 | −20 | 3 | 0.060 | 0.040 | 1.50 | 4.78 | 0.004 | 13 | 2.2 | Not present |
| 118 | 1.2 | 55 | −20 | 3 | 0.060 | 0.005 | 12.0 | 4.78 | 0.004 | 20 | 1.9 | Not present |
| 119 | 1.2 | 55 | −20 | 3 | 0.060 | 0.003 | 20 | 4.76 | 0.004 | 19 | 1.9 | Not present |
| 120 | 1.2 | 55 | −20 | 3 | 0.060 | 0.001 | 60.0 | 4.77 | 0.004 | 18 | 2.1 | Not present |
| 121 | 1.2 | 55 | −20 | 3 | 0.02 | 0.001 | 20 | 4.78 | 0.005 | 3 | 2.4 | Not present |
| 122 | 1.2 | 55 | −20 | 3 | 0.04 | 0.001 | 40 | 4.77 | 0.005 | 13 | 2.3 | Not present |
| 123 | 1.2 | 55 | −20 | 3 | 0.100 | 0.0005 | 200 | 4.76 | 0.005 | 17 | 2.3 | Not present |
| 124 | 1.2 | 55 | −20 | 3 | 0.200 | 0.0005 | 400 | 4.78 | 0.005 | 14 | 2.6 | Not present |
| 125 | 1.2 | 55 | −20 | 3 | 0.210 | 0.0005 | 420 | 4.76 | 0.005 | 5 | 11.4 | Present |
| 126 | 1.2 | 55 | −5 | 3 | 0.060 | 0.020 | 3.0 | 4.77 | 0.005 | 4 | 2.4 | Not present |
| 127 | 1.2 | 55 | −10 | 3 | 0.060 | 0.020 | 3.0 | 4.78 | 0.005 | 13 | 2.3 | Not present |
| 128 | 1.2 | 55 | −30 | 3 | 0.060 | 0.020 | 3.0 | 4.77 | 0.005 | 19 | 2.2 | Not present |

TABLE IV-continued

Data on geometry of insert after cutting edge processing

| Sample No. | Nose R radius (mm) | Apex angle α (°) | Negative land angle (°) | Rake angle β (°) | Negative land width W1 (mm) | Negative land width W2 (mm) | Ratio of negative land widths W1/W2 | Core height h (mm) | Maximum chipping amount of cutting edge ridge line (mm) | Result of cutting Cutting time until damage occurs (min) | Surface roughness (Rz) | Presence of chatter |
|---|---|---|---|---|---|---|---|---|---|---|---|---|
| 129 | 1.2 | 55 | −45 | 3 | 0.060 | 0.020 | 3.0 | 4.77 | 0.005 | 17 | 2.6 | Not present |
| 130 | 1.2 | 55 | −50 | 3 | 0.060 | 0.020 | 3.0 | 4.76 | 0.005 | 7 | 9 | Present |
| 131 | 1.2 | 55 | −20 | 3 | 0.060 | 0.020 | 3.0 | 4.78 | 0.007 | 19 | 2.2 | Not present |
| 132 | 1.2 | 55 | −20 | 1 | 0.060 | 0.020 | 3.0 | 4.77 | 0.002 | 18 | 1.9 | Not present |
| 133 | 1.2 | 55 | −20 | 3 | 0.060 | 0.020 | 3.0 | 4.76 | 0.003 | 23 | 1.9 | Not present |
| 134 | 1.2 | 55 | −20 | 7 | 0.060 | 0.020 | 3.0 | 4.77 | 0.002 | 17 | 2.1 | Not present |
| 135 | 1.2 | 55 | −20 | 10 | 0.060 | 0.020 | 3.0 | 4.76 | 0.002 | 13 | 2.1 | Not present |
| 136 | 1.2 | 55 | −20 | 1 | 0.060 | 0.020 | 3.0 | 4.78 | 0.002 | 20 | 1.8 | Not present |
| 137 | 1.2 | 55 | −20 | 3 | 0.060 | 0.020 | 3.0 | 4.76 | 0.003 | 23 | 1.9 | Not present |
| 138 | 1.2 | 55 | −20 | 7 | 0.060 | 0.020 | 3.0 | 4.77 | 0.002 | 17 | 2.0 | Not present |
| 139 | 1.2 | 55 | −20 | 10 | 0.060 | 0.020 | 3.0 | 4.76 | 0.002 | 14 | 2.1 | Not present |
| 140 | 1.2 | 55 | −20 | 1 | 0.060 | 0.020 | 3.0 | 4.77 | 0.002 | 21 | 1.8 | Not present |
| 141 | 1.2 | 55 | −20 | 3 | 0.060 | 0.020 | 3.0 | 4.76 | 0.003 | 22 | 1.9 | Not present |
| 142 | 1.2 | 55 | −20 | 7 | 0.060 | 0.020 | 3.0 | 4.77 | 0.002 | 18 | 2.0 | Not present |
| 143 | 1.2 | 55 | −20 | 10 | 0.060 | 0.020 | 3.0 | 4.78 | 0.002 | 15 | 2.1 | Not present |

-Embodiment 5-

For a blank material, which is braze joined to carbide base metal for ISO model number CNGA120404 and in which several types of cutting tool material of hard sintered body with different geometries are applied to the surface of a corner portion involved in cutting of the base metal, a nose R portion, an insert lateral face, and a flank face were automatically machined using an automatic grinder, and the cutting inserts for CNGA120408, CNGA120412, CNGA120416 indicated by the samples No. 151 to No. 165 of Table V were produced experimentally, and cutting evaluation was conducted under the conditions described below.

The cutting tool material is such that cBN powder and bonding material powder consisting of TiN and Al were mixed by a ball mill, and sintered using an ultra-high pressure device under the condition of 5 GPa, 1500° C. A cBN sintered body was used that contains 65% volume ratio of cBN particles with an average particle diameter of 0.5 μm, and the remaining consists of Ti compound composed mainly of Tin, Al compound such as a nitride, a boride, an oxide of Al or Si, and very small quantity of W or Co compound.

The cutting inserts of No. 151 to No. 153 are a conventional product in which the rake face was ground in parallel with the insert bottom surface by a planar grinder, then the outer periphery was machined by automatic grinding to form an insert lateral face, a nose R portion, and a flank face, then the holding by the chuck was released, and subsequently, a grinding face of a grinding wheel in rotation, inclined by a specific angle is brought into contact with a cutting edge ridge line portion, and a negative land was formed with the constant angle while a support shaft is rotated, and so the cutting inserts have a rake angle of 0°, and the negative land has a constant width with no gradual decrease from the apex of the nose R portion cutting edge to a position at which the nose R portion cutting edge is connected to a linear cutting edge.

Each of the cutting inserts of No. 154 to No. 156 and No. 163 to No. 165 was produced by a manufacturing method in which even after machining of the outer periphery is performed, a state of holding of the blank material by the chuck is not released, and subsequently, a supplementary negative land is ground, and further subsequently, the rake face is ground. The cutting inserts have the tool geometry of the present invention, the tool geometry having a negative land that gradually decreases from the apex of the nose R to a position at which the nose R portion cutting edge is connected to a linear cutting edge. For the cutting inserts of No. 163 to No. 165, at the time of machining the outer periphery, grinding machining was conducted on the end cutting edge and the side cutting edge so that a curved cutting edge with a maximum bending radius of 24 mm is formed and the curved cutting edge is connected to the cutting edge of the nose R portion at the cutting edge connection points Q1 and Q2.

For the cutting inserts of No. 157 to No. 162 also, a manufacturing method is adopted in which even after machining of the outer periphery is performed, a state of holding of the blank material by the chuck is not released, and subsequently, a supplementary negative land is ground, and further subsequently, the rake face is ground. The cutting inserts have the tool geometry of the present invention, in which a negative land is formed by the manufacturing method, the negative land gradually decreasing from the apex of the nose R portion to a position at which the nose R portion cutting edge is connected to a linear cutting edge, and subsequently, by manual machining using a leutor, a negative land with a constant width was formed only on the cutting edge on one side, the negative land having no gradual decrease in width from the apex of the nose R portion cutting edge to a position at which the nose R portion cutting edge is connected to a linear cutting edge.

For the cutting inserts of No. 159 to No. 162, after a negative land was formed, a round honing of 0.005 mm in plan view was formed on the cutting edge by a brush honing device.

These cutting inserts were each evaluated with mounted in a tool holder for achieving the below-described cutting geometry by cutting the below-mentioned workpiece under the conditions described below.

Cutting edge inclination angle=−5°, side rake angle=−5°, end flank angle=5°, side flank angle=5°, end cutting edge angle=5°, side cutting edge angle=−5°

Workpiece: heat treatment material with HS model number of NCF718 (AMS5662)
Cutting Conditions
Workpiece hardness: HRc 43-44
Cutting speed V=200 mm/min
Depth of cut d=0.2 mm
Feed rate f=0.3 mm/rev
Coolant: Provided (wet cutting)
Type of machining: continuous machining of end face The result of this evaluation test is summarized in Table V.

The cutting inserts of No. 171 to No. 173 are a conventional product in which the rake face was ground in parallel with the insert bottom surface by a planar grinder, then the outer periphery was machined by automatic grinding to form an insert lateral face, a nose R portion, and a flank face, then the holding by the chuck was released, and subsequently, a grinding face of a grinding wheel in rotation, inclined by a specific angle is brought into contact with a cutting edge ridge line portion, and a negative land was formed with the constant angle while a support shaft is rotated, and so the cutting inserts have a rake angle of 0°, and the negative land

TABLE V

| | Data on geometry of insert after cutting edge processing | | | | | | | | Result of cutting | | |
|---|---|---|---|---|---|---|---|---|---|---|---|
| Sample No. | Nose R radius (mm) | Apex angle α (°) | Negative land angle (°) | Rake angle β (°) | Negative land width W1 (mm) | Negative land width W2 (mm) | Ratio of negative land widths W1/W2 | Negative land on left side of apex with nose R (end cutting edge side) *1 | Negative land on right side of apex with nose R (side cutting edge side) *2 | Cutting time until damage occurs (min) | Surface roughness (μm) | Presence of chatter (μm) |
| 151 | 0.8 | 80 | −20 | 0 | 0.060 | 0.060 | 1 | Constant | Constant | 2.2 | 11.1 | Present |
| 152 | 1.2 | 80 | −20 | 0 | 0.060 | 0.060 | 1 | Constant | Constant | 2.2 | 10.6 | Present |
| 153 | 1.6 | 80 | −20 | 0 | 0.060 | 0.055 | 1.09 | Constant | Constant | 2.1 | 10.1 | Present |
| 154 | 0.8 | 80 | −20 | 3 | 0.060 | 0.001 | 60 | Gradual decrease | Gradual decrease | 6.5 | 4.5 | Not present |
| 155 | 1.2 | 80 | −20 | 3 | 0.060 | 0.001 | 60 | Gradual decrease | Gradual decrease | 7.5 | 4.2 | Not present |
| 156 | 1.6 | 80 | −20 | 3 | 0.060 | 0.001 | 60 | Gradual decrease | Gradual decrease | 8.2 | 3.9 | Not present |
| 157 | 0.8 | 80 | −20 | 3 | 0.060 | 0.001 | 60 | Gradual decrease | Constant | 12.5 | 4.6 | Not present |
| 158 | 1.2 | 80 | −20 | 3 | 0.060 | 0.001 | 60 | Gradual decrease | Constant | 15.6 | 4.3 | Not present |
| 159 | 1.6 | 80 | −20 | 3 | 0.060 | 0.001 | 60 | Gradual decrease | Constant | 16.5 | 4.0 | Not present |
| 160 | 0.8 | 80 | −20 | 3 | 0.065 | 0.006 | 10.8 | Gradual decrease | Constant | 14.7 | 4.2 | Not present |
| 161 | 1.2 | 80 | −20 | 3 | 0.065 | 0.006 | 10.8 | Gradual decrease | Constant | 16.6 | 4.1 | Not present |
| 162 | 1.6 | 80 | −20 | 3 | 0.065 | 0.000 | 10.8 | Gradual decrease | Constant | 17.6 | 3.7 | Not present |
| 163 | 0.8 | 80 | −20 | 3 | 0.065 | 0.006 | 10.8 | Gradual decrease | Constant | 14.7 | 4.3 | Not present |
| 164 | 1.2 | 80 | −20 | 3 | 0.065 | 0.006 | 10.8 | Gradual decrease | Constant | 16.6 | 4.2 | Not present |
| 165 | 1.6 | 80 | −20 | 3 | 0.065 | 0.000 | 10.8 | Gradual decrease | Constant | 17.6 | 3.8 | Not present |

*1 Left side when nose R is viewed from flank face with rake face of cutting edge used for cutting facing upward
*2 Right side when nose R is viewed from flank face with rake face of cutting edge used for cutting facing upward -Embodiment 6-

For a blank material, which is braze joined to carbide base metal for ISO model number CNGA120404 and in which several types of cutting tool material of hard sintered body with different geometries are applied to the surface of a corner portion involved in cutting of the base metal, a nose R portion, an insert lateral face, and a flank face were machined by subsequent automatic grinding using an automatic grinder, and trial cutting inserts (samples No. 171 to No. 196 of Table VI) for CNGA120408, CNGA120412, and CNGA120416 were obtained. Each cutting insert was evaluated under the conditions described below.

The cutting tool material is such that cBN powder and bonding material powder consisting of TiN and Al were mixed by a ball mill, and sintered using an ultra-high pressure device under the condition of 5 GPa, 1500° C. Ceramics was used that contains 62% volume ratio of cBN powder with an average particle diameter of 0.5 μm, and the remaining consists of Ti compound composed mainly of Tin, Al compound such as a nitride, a boride, an oxide of Al or Si, and very small quantity of W or Co compound.

has a constant width with no gradual decrease from the apex of the nose R portion cutting edge to a position at which the nose R portion cutting edge is connected to a linear cutting edge.

Each of the cutting inserts of No. 174 to No. 176 was produced by a manufacturing method in which even after machining of the outer periphery is performed, a state of holding of the blank material by the chuck is not released, and subsequently, a supplementary negative land is ground, and further subsequently, the rake face is ground. The cutting inserts have the tool geometry of the present invention, the tool geometry having a negative land that gradually decreases from the apex of the nose R to a position at which the nose R portion cutting edge is connected to a linear cutting edge.

For the cutting inserts of No. 177 to No. 179 also, a manufacturing method is adopted in which even after machining of the outer periphery is performed, a state of holding of the blank material by the chuck is not released, and subsequently, a supplementary negative land is ground, and further subsequently, the rake face is ground. The cutting inserts have the tool geometry of the present invention, in which a negative land is formed by the manufacturing method, the negative land gradually decreasing from the apex of the nose R to a position at which the nose R portion cutting edge is connected to a linear cutting edge, and subsequently, by manual machining using a hand grinder (trade name: leutor), a negative land with a constant width was formed only on the cutting edge on one side, the negative land having no gradual decrease in width from the apex of the nose R portion cutting edge to a position at which the nose R portion cutting edge is connected to a linear cutting edge (the negative land on the other side gradually decreases in width to a position connected to a linear cutting edge).

For the cutting inserts of No. 180 to No. 196 also, a manufacturing method is adopted in which even after machining of the outer periphery is performed, a state of holding of the blank material by the chuck is not released, and subsequently, on the end cutting edge side, similarly to No. 80 to No. 87 of the embodiment 3 (Table III), a supplementary negative land with a constant width is formed, whereas on the side that is used as the side cutting edge, a supplementary negative land is ground in a shape such that the width gradually increases on the linear cutting edge side rather than the nose R portion side, and further subsequently, the rake face is ground. The cutting inserts have the tool geometry of the present invention, the tool geometry having, on the side of cutting edge for the end cutting edge, a negative land that gradually decreases from the apex of the nose R to a position at which the nose R portion cutting edge is connected to a linear cutting edge, the tool geometry having, on the side of cutting edge for the side cutting edge, a negative land that is constant or gradually increases from the apex of the nose R to a position at which the nose R portion cutting edge is connected to a linear cutting edge.

For the cutting inserts of No. 188 to No. 190, similarly to No. 159 to No. 162 of the embodiment 5, after the insert of the present invention was manufactured, a round honing of 0.002 mm in plan view was formed on the cutting edge using a brush honing device.

For the cutting inserts of No. 191 to No. 193, a manufacturing method is adopted in which a blank material, in which cutting tool material of hard sintered body is braze joined to carbide base metal with pre-ground bottom surface and rake face so that the upper surface of the cutting tool material projects upward from the upper surface of the base metal, is machined on the outer periphery by automatic grinding to form an insert lateral face, a nose R portion, and a flank face, and even after machining of the outer periphery is performed, a state of holding of the blank material by the chuck is not released, and subsequently, on the end cutting edge side of the cutting tool material, a supplementary negative land with a constant width is formed, whereas on the side that is used as the side cutting edge, a supplementary negative land is ground in a shape such that the width gradually increases on the linear cutting edge side rather than the nose R portion side, and further subsequently, the rake face is ground. The cutting inserts have the tool geometry of the present invention, the tool geometry having, on the side of cutting edge for the end cutting edge, a negative land that gradually decreases from the apex of the nose R to a position at which the nose R portion cutting edge is connected to a linear cutting edge, the tool geometry having, on the side of cutting edge for the side cutting edge, a negative land that is constant or gradually increases from the apex of the nose R to a position at which the nose R portion cutting edge is connected to a linear cutting edge.

Since a blank material in which the upper surface of the cutting tool material projects upward from the upper surface of the base metal is used, a supplementary negative land in a shape with a width gradually increased on the linear cutting edge side rather than the nose R portion side can be produced on the side that is used as a side cutting edge of the cutting tool material without simultaneously cutting the base metal or with a small quantity of simultaneous cutting if ever.

For the cutting inserts of No. 194 to No. 196, similarly to No. 188 to No. 190, after the insert geometry of the present invention was manufactured, a round honing of 0.002 mm in plan view was formed on the cutting edge using a brush honing device, and subsequently, a TiAlN film having a thickness of 1 µm was coated on the surface by a PVD arc ion plating machine.

Each of the cutting inserts was evaluated with mounted in a tool holder for the below-described cutting geometry by cutting the below-mentioned workpiece under the conditions described below.

Cutting edge inclination angle=−5°, side rake angle=−5°, end flank angle=5°, side flank angle=5°, end cutting edge angle=5°, side cutting edge angle=−5°

Workpiece: heat treatment material with HS model number of NCF718 (AMS5662)

Cutting Conditions

Workpiece hardness: HRc 43-44

Cutting speed V=300 mm/min

Depth of cut d=0.2 mm

Feed rate f=0.13 mm/rev

Coolant: Provided (wet cutting)

Type of machining: continuous machining of outer periphery

The result of this evaluation test is summarized in Table VI.

TABLE VI

| | Data on geometry of insert after cutting edge processing | | | | | | | | | | |
|---|---|---|---|---|---|---|---|---|---|---|---|
| | | | | | | | | Negative land on left | Negative land on right | Ratio of M1 to M2 | Result of cutting | |
| Sample No. | Nose R radius (mm) | Apex angle α (°) | Negative land angle (°) | Rake angle β (°) | Negative land width W1 (mm) | Negative land width W2 (mm) | Ratio of negative land widths W1/W2 | side of apex with nose R (side cutting edge side) *1 | side of apex with nose R (end cutting edge side) *2 | of chamfer of cemented carbide | Cutting time until damage occurs (min) | Presence of chatter (µm) |
| 171 | 0.8 | 80 | −20 | 0 | 0.060 | 0.060 | 1 | Constant | Constant | — | 0.6 | Present |
| 172 | 1.2 | 80 | −20 | 0 | 0.060 | 0.060 | 1 | Constant | Constant | — | 0.7 | Present |
| 173 | 1.6 | 80 | −20 | 0 | 0.060 | 0.055 | 1.09 | Constant | Constant | — | 0.9 | Present |

TABLE VI-continued

Data on geometry of insert after cutting edge processing

| Sample No. | Nose R radius (mm) | Apex angle α (°) | Negative land angle (°) | Rake angle β (°) | Negative land width W1 (mm) | Negative land width W2 (mm) | Ratio of negative land widths W1/W2 | Negative land on left side of apex with nose R (side cutting edge side) *1 | Negative land on right side of apex with nose R (end cutting edge side) *2 | Ratio of M1 to M2 of chamfer of cemented carbide | Cutting time until damage occurs (min) | Presence of chatter (μm) |
|---|---|---|---|---|---|---|---|---|---|---|---|---|
| 174 | 0.8 | 80 | −20 | 3 | 0.060 | 0.005 | 12 | Gradual decrease | Gradual decrease | — | 3.2 | Not present |
| 175 | 1.2 | 80 | −20 | 3 | 0.060 | 0.005 | 12 | Gradual decrease | Gradual decrease | — | 4.1 | Not present |
| 176 | 1.6 | 80 | −20 | 3 | 0.060 | 0.005 | 12 | Gradual decrease | Gradual decrease | — | 5.2 | Not present |
| 177 | 0.8 | 80 | −20 | 3 | 0.060 | 0.005 | 12 | Constant | Gradual decrease | — | 6.3 | Not present |
| 178 | 1.2 | 80 | −20 | 3 | 0.060 | 0.005 | 12 | Constant | Gradual decrease | — | 8.2 | Not present |
| 179 | 1.6 | 80 | −20 | 3 | 0.060 | 0.005 | 12 | Constant | Gradual decrease | — | 9.2 | Not present |
| 180 | 0.8 | 80 | −20 | 3 | 0.060 | 0.005 | 12 | Constant | Gradual decrease | 1.2 | 11.3 | Not present |
| 181 | 1.2 | 80 | −20 | 3 | 0.060 | 0.005 | 12 | Constant | Gradual decrease | 40 | 15.3 | Not present |
| 182 | 1.6 | 80 | −20 | 3 | 0.060 | 0.005 | 12 | Gradual increase | Gradual decrease | 100 | 14.5 | Not present |
| 183 | 1.2 | 80 | −20 | 3 | 0.060 | 0.005 | 12 | Gradual decrease | Gradual decrease | 0.8 | 9.5 | Not present |
| 184 | 1.2 | 80 | −20 | 3 | 0.060 | 0.005 | 12 | Constant | Gradual decrease | 20 | 12 | Not present |
| 185 | 1.2 | 80 | −20 | 3 | 0.060 | 0.005 | 12 | Constant | Gradual decrease | 40 | 15.5 | Not present |
| 186 | 1.2 | 80 | −20 | 3 | 0.060 | 0.005 | 12 | Gradual increase | Gradual decrease | 70 | 15.5 | Not present |
| 187 | 1.2 | 80 | −20 | 3 | 0.060 | 0.005 | 12 | Gradual increase | Gradual decrease | 150 | 9.4 | Not present |
| 188 | 0.8 | 80 | −20 | 3 | 0.072 | 0.006 | 12 | Constant | Gradual decrease | 1.2 | 12.4 | Not present |
| 189 | 1.2 | 80 | −20 | 3 | 0.072 | 0.006 | 12 | Constant | Gradual decrease | 40 | 16.3 | Not present |
| 190 | 1.6 | 80 | −20 | 3 | 0.072 | 0.006 | 12 | Gradual increase | Gradual decrease | 100 | 15.2 | Not present |
| 191 | 0.8 | 80 | −20 | 3 | 0.06 | 0.005 | 12 | Constant | Gradual decrease | — | 11.2 | Not present |
| 192 | 1.2 | 80 | −20 | 3 | 0.06 | 0.005 | 12 | Constant | Gradual decrease | — | 14.1 | Not present |
| 193 | 1.6 | 80 | −20 | 3 | 0.06 | 0.005 | 12 | Gradual increase | Gradual decrease | — | 13.2 | Not present |
| 194 | 0.8 | 80 | −20 | 3 | 0.072 | 0.006 | 12 | Constant | Gradual decrease | 1.2 | 13.3 | Not present |
| 195 | 1.2 | 80 | −20 | 3 | 0.072 | 0.006 | 12 | Constant | Gradual decrease | 40 | 17.2 | Not present |
| 196 | 1.6 | 80 | −20 | 3 | 0.072 | 0.006 | 12 | Gradual increase | Gradual decrease | 100 | 16.0 | Not present |

*1 Left side when nose R is viewed from flank face with rake face of cutting edge used for cutting facing upward
*2 Right side when nose R is viewed from flank face with rake face of cutting edge used for cutting facing upward As seen from the above-described result of the evaluation test, with the cutting insert of the present invention, a stable life is achieved even in machining of a difficult-to-cut material. In addition, since chatter at the time of machining is reduced, a machined surface having better texture and less affected layer is obtained.

REFERENCE SIGNS LIST

1 Cutting insert
1A Blank material
2 Base metal
2a Upper surface
2b Bottom surface
2c Lateral face
2d Bonding surface
3 Seat
4 Cutting tool material
4a Upper surface
5 Nose R portion
6 Flank face
7 Rake face
8 Cutting edge
8a Cutting edge ridge line of nose R portion
8b Linear cutting edge ridge line
9 Negative land
9A Supplementary negative land
10 Chamfer portion
11 Chuck
12 Grinding wheel
13 Polish streaks 14 Round honing face
21 Low rigid portion
22 High rigid portion
23 Fitting part
24 Necking portion
25 Oil hole
26 End cutting edge portion
27 Side cutting edge portion
28 Coating layer
P Apex of nose portion cutting edge
Q1 First point
Q2 Second point

The invention claimed is:

1. A cutting insert including a surface involved in cutting, for which a cutting tool material composed of one of cBN based sintered body, ceramics, and cermet is used, the cutting insert comprising: a flank face; a nose R portion; a rake face having a positive rake angle; and a negative land with unequal width disposed between the rake face and the flank face, wherein a radius of the nose R portion is 0.4 mm or greater and 2.4 mm or less, an apex angle $\alpha$ of the nose R portion is 30° or greater and 95° or less, a rake angle $\beta$ at a position of a bisecting plane of the apex angle of the nose R portion is 1° or greater and 10° or less, a ridge line where the negative land with unequal width and the rake face intersect, and a ridge line where the negative land with unequal width and the flank face intersect are not parallel in plan view, and at least on one side of the negative land with respect to a boundary which is an apex of a nose R portion cutting edge, a width of the negative land with unequal width gradually decreases from the apex of the nose R portion cutting edge to a position at which the nose R portion cutting edge is connected to a linear cutting edge, and let W1 be the width of the negative land with unequal width in plan view at the apex of the nose R portion cutting edge, and W2 be the width of the negative land with unequal width in plan view at the position at which the nose R portion cutting edge is connected to the linear cutting edge, then the W1 is 0.04 mm or greater and 0.2 mm or less, and a ratio of the W1 to the W2 is 1.5 or greater, and the ridge line where the negative land and the rake face intersect has a curved line and connects to the linear cutting edge.

2. The cutting insert according to claim 1,
wherein the cutting tool material is integrally held with a corner portion, involved in cutting, of a base metal, and the flank face, the nose R portion, the cutting edge, and the negative land with unequal width are formed in the cutting tool material.

3. The cutting insert according to claim 1,
wherein a radius of the nose R portion is one of 0.8 mm, 1.2 mm, and 1.6 mm,
the apex angle $\alpha$ of the nose R portion is one of 35°, 55°, 60°, 80°, and 90°,
the rake angle $\beta$ is 1° or greater and 7° or less, and
the ratio of the W1 to the W2 is 1.5 or greater and 200 or less.

4. The cutting insert according to claim 1,
wherein the ratio of the W1 to the W2 is 2 or greater and 60 or less.

5. The cutting insert according to claim 1,
wherein in the negative land with unequal width, on one side with respect to the boundary which is the apex of the nose R portion cutting edge, the width gradually decreases from the apex of the nose R portion cutting edge to the position at which the nose R portion cutting edge is connected to the linear cutting edge, and on the other side with respect to the boundary which is the apex of the nose R portion cutting edge, the width is constant or gradually increases to the position connected to the linear cutting edge.

6. The cutting insert according to claim 5,
wherein the cutting tool material is integrally held with the corner portion, involved in cutting, of the base metal, the base metal has a chamfer portion with unequal width, in which a width gradually increases as being away from the corner portion, the chamfer portion is connected to the negative land on the other side in which the width is constant, and let M1 be a chamfer width in a normal direction to a lateral face of the base metal in plan view at an end of an opposite side of the chamfer portion with respect to the corner portion, and M2 be a chamfer width in a normal direction to the lateral face in plan view at an end of the corner portion, then the ratio of the M1 to the M2 is set to 1.2 or greater and 100 or less.

7. The cutting insert according to claim 1,
wherein the cutting edge has a round honing face with a width of 0.03 mm to 0.3 mm.

8. The cutting insert according to claim 1, further comprising a coating layer composed of a carbide, a nitride, a boride, or an oxide of Ti, Al, Si, Cr, and Zr.

* * * * *